US008631093B2

(12) United States Patent
Defossé

(10) Patent No.: US 8,631,093 B2
(45) Date of Patent: Jan. 14, 2014

(54) REMOTE DATA ACQUISITION, TRANSMISSION AND ANALYSIS SYSTEM INCLUDING HANDHELD WIRELESS EQUIPMENT

(75) Inventor: Erin M. Defossé, Austin, TX (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 557 days.

(21) Appl. No.: 11/560,480

(22) Filed: Nov. 16, 2006

(65) Prior Publication Data

US 2007/0112907 A1 May 17, 2007

Related U.S. Application Data

(63) Continuation of application No. 09/971,170, filed on Oct. 4, 2001, now Pat. No. 7,181,501, and a continuation-in-part of application No. 09/267,254, filed on Mar. 12, 1999, now Pat. No. 6,457,038.

(60) Provisional application No. 60/078,645, filed on Mar. 19, 1998, provisional application No. 60/099,434, filed on Sep. 8, 1998, provisional application No. 60/238,313, filed on Oct. 5, 2000.

(51) Int. Cl.
*G06F 15/16* (2006.01)

(52) U.S. Cl.
USPC ........ 709/219; 710/15; 379/142.04; 329/304; 340/10.1; 340/431; 340/10.2; 340/10.4; 340/572.1; 713/168; 235/383; 235/375; 235/462.01; 235/472.01; 235/462.45; 235/380; 209/3.3; 209/576; 705/23; 705/1.1

(58) Field of Classification Search
USPC .......... 709/219
See application file for complete search history.

(56) References Cited

U.S. PATENT DOCUMENTS

| | | | | |
|---|---|---|---|---|
| 3,784,737 | A | 1/1974 | Waehner | 178/6 |
| 4,306,219 | A | 12/1981 | Main et al. | |
| 4,369,442 | A | 1/1983 | Werth et al. | 340/825.35 |
| 4,412,292 | A | 10/1983 | Sedam et al. | 364/479 |
| 4,454,670 | A | 6/1984 | Bachmann et al. | 40/584 |

(Continued)

FOREIGN PATENT DOCUMENTS

| | | | |
|---|---|---|---|
| DE | 41 40 450 | A1 | 6/1993 |
| EP | 0 564 736 | A1 | 10/1993 |

(Continued)

OTHER PUBLICATIONS

Webster et al., "Controlling a Java Enabled Pepsi Vending Machine Over the World Wide Web", 1999.*

(Continued)

*Primary Examiner* — Tamara T Kyle
*Assistant Examiner* — Ondrej Vostal

(57) ABSTRACT

A remote data acquisition, transmission and analysis system including handheld wireless equipment to obtain operational data and the status of remote machines is disclosed. A plurality of application controllers are interfaced with the remote machines from which operation data is acquired by the application controllers. The application controllers communicate with an application host via a local area network. The application host may communicate with a network operations center using a wide area network. The handheld wireless equipment may be used to obtain operational information for each remote machine from the network operations center.

33 Claims, 10 Drawing Sheets

(56) References Cited

U.S. PATENT DOCUMENTS

| | | | | | |
|---|---|---|---|---|---|
| 4,553,211 | A | | 11/1985 | Kawasaki et al. | 364/479 |
| 4,611,205 | A | | 9/1986 | Eglise | 340/825.35 |
| 4,661,862 | A | | 4/1987 | Thompson | 358/335 |
| 4,677,565 | A | | 6/1987 | Ogaki et al. | 364/479 |
| 4,766,548 | A | | 8/1988 | Cedrone et al. | 364/479 |
| 4,850,009 | A | | 7/1989 | Zook et al. | 379/96 |
| 4,926,996 | A | | 5/1990 | Eglise et al. | 194/212 |
| 4,954,697 | A | | 9/1990 | Kokubun et al. | 235/381 |
| 4,961,533 | A | * | 10/1990 | Teller et al. | 177/25.19 |
| 5,029,098 | A | | 7/1991 | Levasseur | 364/479 |
| 5,077,582 | A | | 12/1991 | Kravette et al. | 355/206 |
| 5,090,589 | A | | 2/1992 | Brandes et al. | 221/2 |
| 5,091,713 | A | | 2/1992 | Horne et al. | 340/541 |
| 5,117,407 | A | | 5/1992 | Vogel | 369/30 |
| 5,166,886 | A | * | 11/1992 | Molnar et al. | 700/234 |
| 5,184,179 | A | | 2/1993 | Tarr et al. | 355/206 |
| 5,207,784 | A | | 5/1993 | Schwartzendruber | 221/6 |
| 5,239,480 | A | | 8/1993 | Huegel | 364/479 |
| 5,255,819 | A | | 10/1993 | Peckels | 222/1 |
| 5,282,127 | A | | 1/1994 | Mii | 64/479 |
| 5,323,155 | A | | 6/1994 | Iyer et al. | 341/51 |
| 5,337,253 | A | | 8/1994 | Berkovsky et al. | 364/479 |
| 5,339,250 | A | | 8/1994 | Durbin | 364/479 |
| 5,369,784 | A | * | 11/1994 | Nelson | 455/503 |
| 5,371,348 | A | | 12/1994 | Kumar et al. | 235/472 |
| 5,386,360 | A | | 1/1995 | Wilson et al. | 364/146 |
| 5,400,246 | A | | 3/1995 | Wilson et al. | 364/146 |
| 5,418,945 | A | | 5/1995 | Carter et al. | 395/600 |
| 5,445,295 | A | | 8/1995 | Brown | 221/3 |
| 5,445,347 | A | * | 8/1995 | Ng | 246/169 R |
| 5,464,087 | A | | 11/1995 | Bounds et al. | |
| 5,505,349 | A | | 4/1996 | Peckels | 222/641 |
| 5,507,411 | A | | 4/1996 | Peckels | 222/1 |
| 5,521,958 | A | | 5/1996 | Selig et al. | |
| 5,561,604 | A | | 10/1996 | Buckley et al. | 364/479.05 |
| 5,608,643 | A | * | 3/1997 | Wichter et al. | 700/244 |
| 5,617,084 | A | | 4/1997 | Sears | |
| 5,620,079 | A | | 4/1997 | Molbak | 194/217 |
| 5,629,981 | A | * | 5/1997 | Nerlikar | 713/168 |
| 5,649,308 | A | | 7/1997 | Andrews | 370/334 |
| 5,671,362 | A | | 9/1997 | Cowe et al. | 395/228 |
| 5,701,252 | A | | 12/1997 | Facchin et al. | 364/479 |
| 5,708,223 | A | | 1/1998 | Wyss | 73/865.9 |
| 5,737,318 | A | | 4/1998 | Melnik | |
| 5,745,036 | A | * | 4/1998 | Clare | 340/572.1 |
| 5,769,269 | A | | 6/1998 | Peters | 221/7 |
| 5,785,181 | A | * | 7/1998 | Quartararo, Jr. | 209/3.3 |
| 5,787,149 | A | | 7/1998 | Yousefi et al. | 379/59 |
| 5,787,459 | A | | 7/1998 | Stallmo et al. | |
| 5,794,144 | A | | 8/1998 | Comer et al. | 455/426 |
| 5,805,997 | A | | 9/1998 | Farris | 455/466 |
| 5,815,652 | A | | 9/1998 | Ote et al. | 395/183.07 |
| 5,818,603 | A | | 10/1998 | Motoyama | 358/296 |
| 5,822,216 | A | | 10/1998 | Satchell, Jr. et al. | 364/479.01 |
| 5,841,866 | A | | 11/1998 | Bruwer et al. | 380/23 |
| 5,842,597 | A | | 12/1998 | Kraus et al. | 221/150 R |
| 5,844,808 | A | | 12/1998 | Konsmo et al. | 364/479.14 |
| 5,845,255 | A | * | 12/1998 | Mayaud | 705/3 |
| 5,850,187 | A | | 12/1998 | Carrender et al. | 340/825.54 |
| 5,860,362 | A | | 1/1999 | Smith | 101/494 |
| 5,862,517 | A | | 1/1999 | Honey et al. | 364/559 |
| 5,867,688 | A | | 2/1999 | Simmon et al. | 395/500 |
| 5,867,768 | A | * | 2/1999 | Onda | 455/11.1 |
| 5,883,582 | A | * | 3/1999 | Bowers et al. | 340/10.2 |
| 5,892,758 | A | | 4/1999 | Argyroudis | 370/335 |
| 5,898,904 | A | | 4/1999 | Wang | 455/31.3 |
| 5,905,442 | A | | 5/1999 | Mosebrook et al. | 340/3.7 |
| 5,905,882 | A | | 5/1999 | Sakagami et al. | 700/86 |
| 5,907,491 | A | | 5/1999 | Canada et al. | 364/468.15 |
| 5,909,183 | A | | 6/1999 | Borgstahl et al. | 340/825.22 |
| 5,915,207 | A | | 6/1999 | Dao et al. | 455/9 |
| 5,918,213 | A | * | 6/1999 | Bernard et al. | 705/26.35 |
| 5,924,081 | A | | 7/1999 | Ostendorf et al. | 705/30 |
| 5,930,770 | A | | 7/1999 | Edgar | 705/28 |
| 5,930,771 | A | | 7/1999 | Stapp | 705/28 |
| 5,941,363 | A | | 8/1999 | Partyka et al. | 194/217 |
| 5,943,042 | A | | 8/1999 | Siio | 345/172 |
| 5,949,779 | A | | 9/1999 | Mostafa et al. | 370/389 |
| 5,950,630 | A | | 9/1999 | Portwood et al. | 128/897 |
| 5,956,487 | A | | 9/1999 | Venkatraman et al. | 709/218 |
| 5,957,262 | A | | 9/1999 | Molbak et al. | 194/200 |
| 5,959,536 | A | | 9/1999 | Chambers et al. | 710/104 |
| 5,959,869 | A | * | 9/1999 | Miller et al. | 700/231 |
| 5,963,134 | A | * | 10/1999 | Bowers et al. | 340/572.1 |
| 5,974,238 | A | | 10/1999 | Chase, Jr. | |
| 5,974,348 | A | * | 10/1999 | Rocks | 701/28 |
| 5,978,475 | A | | 11/1999 | Schneier et al. | |
| 5,978,912 | A | * | 11/1999 | Rakavy et al. | 713/2 |
| 5,979,757 | A | | 11/1999 | Tracy et al. | 235/383 |
| 5,982,325 | A | | 11/1999 | Thornton et al. | 342/357.07 |
| 5,982,652 | A | | 11/1999 | Simonelli et al. | 363/142 |
| 5,986,219 | A | | 11/1999 | Carroll et al. | 177/1 |
| 5,990,575 | A | | 11/1999 | Flaugher | |
| 5,991,749 | A | | 11/1999 | Morrill, Jr. | 705/44 |
| 5,991,795 | A | * | 11/1999 | Howard et al. | 709/201 |
| 5,997,170 | A | | 12/1999 | Brodbeck | 364/479.06 |
| 6,003,070 | A | | 12/1999 | Frantz | 709/206 |
| 6,005,487 | A | | 12/1999 | Hyatt, Jr. et al. | |
| 6,005,850 | A | | 12/1999 | Moura et al. | 370/282 |
| 6,012,041 | A | | 1/2000 | Brewer et al. | 705/28 |
| 6,021,137 | A | | 2/2000 | Kato et al. | |
| 6,021,324 | A | | 2/2000 | Sizer, II et al. | 455/403 |
| 6,021,437 | A | | 2/2000 | Chen et al. | 709/224 |
| 6,029,143 | A | | 2/2000 | Mosher et al. | 705/28 |
| 6,032,202 | A | | 2/2000 | Lea et al. | 710/8 |
| 6,038,486 | A | | 3/2000 | Saitoh et al. | |
| 6,038,491 | A | | 3/2000 | McGarry et al. | 700/231 |
| 6,052,667 | A | | 4/2000 | Walker et al. | 705/15 |
| 6,052,750 | A | | 4/2000 | Lea | 710/72 |
| 6,056,194 | A | | 5/2000 | Kolls | 235/381 |
| 6,057,758 | A | | 5/2000 | Dempsey et al. | 340/539 |
| 6,061,668 | A | | 5/2000 | Sharrow | 705/400 |
| 6,068,305 | A | | 5/2000 | Myers et al. | 292/201 |
| 6,070,070 | A | | 5/2000 | Ladue | 455/419 |
| 6,072,521 | A | | 6/2000 | Harrison et al. | 348/12 |
| 6,073,840 | A | * | 6/2000 | Marion | 235/381 |
| 6,084,528 | A | * | 7/2000 | Beach et al. | 340/5.9 |
| 6,085,888 | A | | 7/2000 | Tedesco et al. | 194/217 |
| 6,098,116 | A | * | 8/2000 | Nixon et al. | 710/8 |
| 6,109,524 | A | | 8/2000 | Kanoh et al. | 235/381 |
| 6,119,053 | A | | 9/2000 | Taylor et al. | 700/231 |
| 6,119,100 | A | | 9/2000 | Walker et al. | 705/20 |
| 6,124,800 | A | | 9/2000 | Beard et al. | 340/825.35 |
| 6,124,806 | A | | 9/2000 | Cunningham et al. | |
| 6,131,399 | A | | 10/2000 | Hall | 62/127 |
| 6,154,790 | A | * | 11/2000 | Pruett et al. | 710/15 |
| 6,160,993 | A | * | 12/2000 | Wilson | 455/12.1 |
| 6,161,059 | A | | 12/2000 | Tedesco et al. | 700/232 |
| 6,163,811 | A | | 12/2000 | Porter | 709/247 |
| 6,169,896 | B1 | | 1/2001 | Sant et al. | |
| 6,179,206 | B1 | * | 1/2001 | Matsumori | 235/383 |
| 6,181,981 | B1 | * | 1/2001 | Varga et al. | 700/236 |
| 6,185,545 | B1 | | 2/2001 | Resnick et al. | 705/40 |
| 6,199,753 | B1 | | 3/2001 | Tracy et al. | 235/375 |
| 6,230,150 | B1 | | 5/2001 | Walker et al. | 705/400 |
| 6,250,452 | B1 | * | 6/2001 | Partyka et al. | 194/217 |
| 6,272,395 | B1 | | 8/2001 | Brodbeck | 700/236 |
| 6,289,453 | B1 | | 9/2001 | Walker et al. | 713/175 |
| 6,301,344 | B1 | | 10/2001 | Meyer et al. | |
| 6,304,895 | B1 | | 10/2001 | Schneider et al. | 709/203 |
| 6,307,208 | B1 | * | 10/2001 | Cocuzza et al. | 235/472.01 |
| 6,317,649 | B1 | | 11/2001 | Tedesco et al. | 700/232 |
| 6,321,986 | B1 | * | 11/2001 | Ackley | 235/462.01 |
| 6,324,520 | B1 | | 11/2001 | Walker et al. | 705/16 |
| 6,338,149 | B1 | | 1/2002 | Ciccone, Jr. et al. | 714/38 |
| 6,339,731 | B1 | | 1/2002 | Morris et al. | 700/236 |
| 6,341,271 | B1 | | 1/2002 | Salvo et al. | 705/28 |
| 6,356,794 | B1 | | 3/2002 | Perin, Jr. et al. | 700/78 |
| 6,359,547 | B1 | | 3/2002 | Denison et al. | |
| 6,383,076 | B1 | * | 5/2002 | Tiedeken | 463/40 |
| 6,384,711 | B1 | | 5/2002 | Cregger et al. | |
| 6,385,772 | B1 | | 5/2002 | Courtney | 725/105 |
| 6,386,908 | B2 | | 5/2002 | Kato et al. | |
| 6,394,355 | B1 | * | 5/2002 | Schlieffers et al. | 235/472.01 |

(56) References Cited

U.S. PATENT DOCUMENTS

| | | | | |
|---|---|---|---|---|
| 6,405,111 | B2 * | 6/2002 | Rogers et al. | 701/33 |
| 6,416,324 | B1 * | 7/2002 | Day | 433/173 |
| 6,427,912 | B1 | 8/2002 | Levasseur | 235/381 |
| 6,434,534 | B1 | 8/2002 | Walker et al. | 705/14 |
| 6,437,692 | B1 | 8/2002 | Petite et al. | 340/540 |
| 6,442,532 | B1 | 8/2002 | Kawan | 705/35 |
| 6,446,049 | B1 * | 9/2002 | Janning et al. | 705/40 |
| 6,453,353 | B1 | 9/2002 | Win et al. | |
| 6,457,038 | B1 * | 9/2002 | Defosse | 709/200 |
| 6,462,644 | B1 | 10/2002 | Howell et al. | 340/5.92 |
| 6,467,685 | B1 | 10/2002 | Teicher | 235/379 |
| 6,502,131 | B1 | 12/2002 | Vaid et al. | 709/224 |
| 6,505,095 | B1 | 1/2003 | Kolls | 700/244 |
| 6,525,644 | B1 | 2/2003 | Stillwagon | 340/5.61 |
| 6,550,672 | B1 | 4/2003 | Tracy et al. | 235/383 |
| 6,553,336 | B1 | 4/2003 | Johnson et al. | 702/188 |
| 6,574,603 | B1 * | 6/2003 | Dickson et al. | 705/15 |
| 6,581,986 | B2 | 6/2003 | Roatis et al. | 292/199 |
| 6,584,309 | B1 | 6/2003 | Whigham | 455/414 |
| 6,604,086 | B1 | 8/2003 | Kolls | 705/14 |
| 6,604,087 | B1 | 8/2003 | Kolls | 705/14 |
| 6,606,602 | B1 | 8/2003 | Kolls | 705/14 |
| 6,606,605 | B1 | 8/2003 | Kolls | 705/26 |
| 6,609,113 | B1 | 8/2003 | O'Leary et al. | 705/39 |
| 6,615,623 | B1 | 9/2003 | Ormerod | 70/224 |
| 6,650,120 | B2 | 11/2003 | Krampitz | |
| 6,695,166 | B2 | 2/2004 | Long | 221/14 |
| 6,704,714 | B1 | 3/2004 | O'Leary et al. | 705/39 |
| 6,712,266 | B2 | 3/2004 | Bartley et al. | 235/380 |
| 6,714,977 | B1 | 3/2004 | Fowler et al. | 709/224 |
| 6,735,630 | B1 | 5/2004 | Gelvin et al. | 709/224 |
| 6,738,811 | B1 | 5/2004 | Liang | 709/224 |
| 6,748,296 | B2 | 6/2004 | Banerjee et al. | 700/241 |
| 6,751,562 | B1 | 6/2004 | Blackett et al. | 702/61 |
| 6,754,558 | B2 * | 6/2004 | Preston et al. | 700/236 |
| 6,772,048 | B1 | 8/2004 | Leibu et al. | 700/241 |
| 6,810,304 | B1 * | 10/2004 | Dickson | 700/241 |
| 6,826,607 | B1 | 11/2004 | Gelvin et al. | 709/224 |
| 6,832,251 | B1 | 12/2004 | Gelvin et al. | 709/224 |
| 6,837,436 | B2 | 1/2005 | Swartz et al. | 235/472.02 |
| 6,844,813 | B2 | 1/2005 | Hardman | 340/539.1 |
| 6,850,252 | B1 | 2/2005 | Hoffberg | 345/716 |
| 6,859,831 | B1 | 2/2005 | Gelvin et al. | 709/224 |
| 6,867,685 | B1 | 3/2005 | Stillwagon | 340/5.64 |
| 6,876,988 | B2 | 4/2005 | Helsper et al. | 706/21 |
| 6,900,720 | B2 | 5/2005 | Denison et al. | 340/5.9 |
| 6,912,448 | B2 * | 6/2005 | Shur | 700/236 |
| 6,925,335 | B2 * | 8/2005 | May et al. | 700/9 |
| 6,952,169 | B1 * | 10/2005 | Simtion | 340/577 |
| 6,952,676 | B2 | 10/2005 | Sherman | |
| 6,959,265 | B1 | 10/2005 | Candela et al. | 702/186 |
| 6,970,952 | B2 * | 11/2005 | Motoyama | 710/15 |
| 6,973,475 | B2 | 12/2005 | Kenyon et al. | 709/203 |
| 6,975,202 | B1 | 12/2005 | Rodriguez et al. | |
| 7,010,363 | B2 | 3/2006 | Donnelly et al. | |
| 7,017,085 | B2 | 3/2006 | Braun | 714/47 |
| 7,020,680 | B2 * | 3/2006 | Defosse | 709/201 |
| 7,053,773 | B2 * | 5/2006 | McGarry et al. | 340/568.1 |
| 7,076,329 | B1 | 7/2006 | Kolls | 700/232 |
| 7,103,511 | B2 * | 9/2006 | Petite | 702/188 |
| 7,131,575 | B1 | 11/2006 | Kolls | 235/379 |
| 7,152,783 | B2 | 12/2006 | Charrin | |
| 7,164,884 | B2 | 1/2007 | Defossee et al. | |
| 7,167,892 | B2 | 1/2007 | Defosse et al. | |
| 7,171,451 | B2 | 1/2007 | Defosse | |
| 7,181,501 | B2 | 2/2007 | Defosse | |
| 7,191,034 | B2 | 3/2007 | Whitten et al. | 700/244 |
| 7,286,901 | B2 | 10/2007 | Whitten et al. | 700/244 |
| 7,292,914 | B2 * | 11/2007 | Jungmann et al. | 700/285 |
| 7,464,867 | B1 | 12/2008 | Kolls | |
| 7,480,543 | B2 * | 1/2009 | Bautista et al. | 700/240 |
| 7,546,277 | B1 | 6/2009 | Tedesco et al. | |
| 7,604,145 | B2 * | 10/2009 | Percy | 221/95 |
| 7,640,185 | B1 * | 12/2009 | Giordano et al. | 705/23 |
| 7,791,479 | B2 * | 9/2010 | Dearing et al. | 340/572.1 |
| 7,818,078 | B2 | 10/2010 | Iriarte | |
| 7,865,430 | B1 | 1/2011 | Kolls | |
| 2001/0002210 | A1 | 5/2001 | Petite | 379/155 |
| 2001/0034566 | A1 | 10/2001 | Offer | 700/236 |
| 2001/0042121 | A1 | 11/2001 | Defosse et al. | 709/224 |
| 2001/0047410 | A1 | 11/2001 | Defosse | 709/224 |
| 2001/0047441 | A1 | 11/2001 | Robertson | |
| 2001/0054083 | A1 | 12/2001 | Defosse | 709/217 |
| 2002/0004690 | A1 | 1/2002 | Paulucci et al. | |
| 2002/0005707 | A1 | 1/2002 | Kerai et al. | |
| 2002/0014950 | A1 * | 2/2002 | Ayala et al. | 340/5.6 |
| 2002/0016829 | A1 | 2/2002 | Defosse | 709/217 |
| 2002/0024420 | A1 | 2/2002 | Ayala et al. | 340/5.61 |
| 2002/0032470 | A1 | 3/2002 | Linberg | 607/60 |
| 2002/0038432 | A1 | 3/2002 | Hsu | |
| 2002/0062338 | A1 | 5/2002 | McCurley et al. | |
| 2002/0077724 | A1 | 6/2002 | Paulucci et al. | |
| 2002/0077889 | A1 * | 6/2002 | Kolls | 705/14 |
| 2002/0099608 | A1 | 7/2002 | Pons et al. | |
| 2002/0107610 | A1 | 8/2002 | Kaehler et al. | 700/232 |
| 2002/0147598 | A1 | 10/2002 | Smith et al. | |
| 2002/0169539 | A1 | 11/2002 | Menard et al. | 701/200 |
| 2002/0180582 | A1 * | 12/2002 | Nielsen | 340/5.6 |
| 2002/0194387 | A1 | 12/2002 | Defosse | 709/251 |
| 2002/0198990 | A1 * | 12/2002 | Bradfield et al. | 709/224 |
| 2003/0003865 | A1 * | 1/2003 | Defosse et al. | 455/41 |
| 2003/0013482 | A1 | 1/2003 | Brankovic | 455/553 |
| 2003/0026268 | A1 * | 2/2003 | Navas | 370/400 |
| 2003/0050841 | A1 | 3/2003 | Preston et al. | 705/16 |
| 2003/0057226 | A1 * | 3/2003 | Long | 221/92 |
| 2003/0061094 | A1 * | 3/2003 | Banerjee et al. | 705/14 |
| 2003/0074106 | A1 * | 4/2003 | Butler | 700/236 |
| 2003/0097464 | A1 * | 5/2003 | Martinez et al. | 709/238 |
| 2003/0097474 | A1 | 5/2003 | Defosse et al. | 709/246 |
| 2003/0101257 | A1 | 5/2003 | Godwin | 709/223 |
| 2003/0101262 | A1 | 5/2003 | Godwin | 709/224 |
| 2003/0110063 | A1 | 6/2003 | Among et al. | |
| 2003/0128101 | A1 | 7/2003 | Long | 340/5.26 |
| 2003/0137399 | A1 * | 7/2003 | Bauer et al. | 340/5.73 |
| 2003/0149827 | A1 | 8/2003 | Smolen et al. | |
| 2003/0158625 | A1 * | 8/2003 | Carstens et al. | 700/236 |
| 2003/0172115 | A1 * | 9/2003 | Motoyama | 709/206 |
| 2003/0181168 | A1 | 9/2003 | Herrod et al. | |
| 2003/0204391 | A1 | 10/2003 | May et al. | 704/8 |
| 2003/0217357 | A1 * | 11/2003 | Parry | 717/168 |
| 2003/0234719 | A1 | 12/2003 | Denison et al. | |
| 2004/0025002 | A1 * | 2/2004 | Cepulis et al. | 713/2 |
| 2004/0133653 | A1 | 7/2004 | Defosse et al. | |
| 2004/0207509 | A1 | 10/2004 | Mlynarczyk et al. | 340/5.23 |
| 2005/0060062 | A1 | 3/2005 | Walker et al. | |
| 2005/0064896 | A1 | 3/2005 | Rautiola et al. | |
| 2005/0107924 | A1 * | 5/2005 | Bailey et al. | 700/284 |
| 2005/0131577 | A1 | 6/2005 | Ota et al. | 700/242 |
| 2005/0161953 | A1 | 7/2005 | Roatis et al. | 292/199 |
| 2005/0179544 | A1 | 8/2005 | Sutton et al. | 340/543 |
| 2005/0260975 | A1 | 11/2005 | Chen et al. | |
| 2005/0262202 | A1 * | 11/2005 | Motoyama et al. | 709/206 |
| 2005/0284491 | A1 * | 12/2005 | Tashiro et al. | 128/897 |
| 2005/0285716 | A1 | 12/2005 | Denison et al. | |
| 2006/0047533 | A1 | 3/2006 | Smolen et al. | |
| 2006/0094462 | A1 | 5/2006 | Nguyen et al. | |
| 2006/0122881 | A1 | 6/2006 | Walker et al. | |
| 2006/0229108 | A1 | 10/2006 | Cehelnik | |
| 2007/0015537 | A1 | 1/2007 | DeBiasio et al. | |
| 2007/0050465 | A1 | 3/2007 | Canter et al. | |
| 2007/0096867 | A1 | 5/2007 | Denison et al. | 340/5.23 |
| 2008/0052148 | A1 | 2/2008 | Walker et al. | |
| 2009/0051486 | A1 | 2/2009 | Denison et al. | |
| 2009/0113038 | A1 | 4/2009 | Godwin | |

FOREIGN PATENT DOCUMENTS

| | | | | |
|---|---|---|---|---|
| EP | 0 602 787 | A2 | 10/1993 | |
| EP | 0 817 138 | A1 | 1/1998 | |
| EP | 0 999 529 | | 5/2000 | G07F 9/02 |
| EP | 1096408 | | 5/2001 | G06F 17/60 |
| FR | 2 744 545 | | 2/1996 | |
| FR | 2 755776 | | 5/1998 | G06F 17/60 |
| JP | 04253294 | | 9/1992 | |

(56) References Cited

FOREIGN PATENT DOCUMENTS

| | | | | |
|---|---|---|---|---|
| JP | 6296335 A2 | 10/1994 | .............. | H02J 13/00 |
| JP | 9198172 A2 | 7/1997 | ................ | G06F 3/00 |
| JP | 10105802 | 4/1998 | ............... | H04Q 7/38 |
| WO | WO 89/07807 | 8/1989 | | |
| WO | WO 95/04333 | 2/1995 | | |
| WO | WO 95/05609 | 2/1995 | | |
| WO | WO 97/09667 | 3/1997 | ................ | G06F 1/00 |
| WO | WO 98/45779 | 10/1998 | .............. | G06F 11/00 |
| WO | WO 99/23620 | 5/1999 | ................ | G07F 9/02 |
| WO | WO 99/27465 | 6/1999 | .............. | G06F 17/00 |
| WO | WO 99/36751 | 7/1999 | ............... | G01G 9/00 |
| WO | WO 99/48065 | 9/1999 | ................ | G07F 9/02 |
| WO | WO 00/04475 | 1/2000 | .............. | G06F 17/60 |
| WO | WO 00/04476 | 1/2000 | .............. | G06F 17/60 |
| WO | WO 00/31701 | 6/2000 | ................ | G07F 9/02 |
| WO | WO 02/19281 | 3/2002 | ................ | G07F 7/00 |

OTHER PUBLICATIONS

Hendry et al., "Implementing Bar Coding—Just Jumping on a Band Wagon ?", 1995.*
Knorr, "On Digital Money and Card Technologies", 1997.*
European Vending Association, "Overview of Vending Machine Interfaces", 2012.*
Hicks et al., "Application of Automated Data-Scanning Techniques to U.S. Army Directories of Engineering and Housing Operations", 1991.*
Thornsbury et al., "Fresh Produce Intermediaries: Impacts of Change in Away-from-Home Food Markets and Trade Practices", © 1999-2006 Choices.*
Skywire Provides Details of Wireless 'VendView' System; Vending Times, Sep. 1994.
Wireless Communications Forum; vol. III, No. 1 pp. 25-30, Apr. 1995.
Left high and dry? Sold-out machine sends for Cokes; Nashville Banner, Aug. 16, 1995.
Leitch, Carolyn, "Coke machines signal when it's time for a refill"; The Globe & Mail, Toronto, Ontario, Aug. 30, 1995.
Meet the Smart Coke Machine; The Sacramento Bee Business Technology; Wednesday, Aug. 30, 1995.
Skywire allows vendor tracking of pop stock and sales details; RCR, vol. 14, No. 17, Sep. 4, 1995.
International Search Report for PCT/US99/05983 7 pages, Aug. 13, 1999.
American Power Conversion Internet Article, "Lightning Advisor", at interne, <http://lightning.apcc.com>, May 10, 2000.
American Products Internet Article, "Product Information", at internet, <http://www.apc.com>, May 10, 2000.
NetBotz Internet Article, "Welcome to Netbotz" at internet <http:www-ww.netbotz.com>, May 10, 2000.
*BT redcare Telemetry Vending Interface Unit* (*VIU*), Antronics Ltd Case Study, <http:www.antronic.co.uk/portfolio/viu>, 4 pgs, 2001.
International Search Report PCT/US01/16749, Dec. 20, 2001.
International Search Report PCT/US01/15522, May 16, 2002.
International Search Report PCT US 01/41640, Aug. 21, 2002.
International Search Report PCT/US 01/31381, Nov. 7, 2002.
International Preliminary Examination Report PCT/US01/31381, May 12, 2003.
International Search Report PCT/US 03/37776, May 17, 2004.
What is an iButton?, Maxim/Dallas, http://www.maxim-ic.corn/products/ibutton/ibuttons (3 pages), Dec. 29, 2005.
Office Action dated May 11, 2009 in connection with U.S. Appl. No. 11/464,127.
Office Action dated Sep. 29, 2008 in connection with U.S. Appl. No. 11/464,127.
Office Action dated Apr. 1, 2009 in connection with U.S. Appl. No. 11/374,339.
Office Action dated Feb. 13, 2009 in connection with U.S. Appl. No. 11/299,607.
Office Action dated Feb. 26, 2009 in connection with U.S. Appl. No. 11/608,987.
Office Action dated Aug. 4, 2009 in connection with U.S. Appl. No. 11/608,987.
Office Action dated Sep. 29, 2008 in connection with U.S. Appl. No. 11/608,987.
Office Action dated Jul. 17, 2008 in connection with U.S. Appl. No. 11/608,987.
Office Action dated Dec. 28, 2007 in connection with U.S. Appl. No. 11/608,987.
Office Action dated Jun. 9, 2009 in connection with U.S. Appl. No. 11/299,607.
Office Action dated Sep. 18, 2008 in connection with U.S. Appl. No. 11/299,607.
Office Action dated Jun. 11, 2009 in connection with U.S. Appl. No. 11/468,766.
Office Action dated Jul. 12, 2005 in connection with U.S. Appl. No. 10/208,221.
Office Action dated Dec. 22, 2004 in connection with U.S. Appl. No. 10/208,221.
Office Action dated Apr. 8, 2004 in connection with U.S. Appl. No. 10/208,221.
Office Action dated Aug. 9, 2005 in connection with U.S. Appl. No. 10/722,954.
Office Action dated Dec. 21, 2004 in connection with U.S. Appl. No. 10/722,954.
Office Action dated Feb. 14, 2005 in connection with U.S. Appl. No. 09/923,046.
Office Action dated Feb. 10, 2005 in connection with U.S. Appl. No. 09/971,170.
Office Action dated Feb. 19, 2002 in connection with U.S. Appl. No. 09/267,254.
Office Action dated Jan. 31, 2001 in connection with U.S. Appl. No. 09/267,254.
Office Action dated Oct. 24, 2001 in connection with U.S. Appl. No. 09/267,254.
Office Action dated Jun. 28, 2001 in connection with U.S. Appl. No. 09/267,254.
Office Action dated Dec. 4, 2009 in connection with U.S. Appl. No. 11/464,127.
Office Action dated Nov. 23, 2009 in connection with U.S. Appl. No. 11/374,339.
Office Action dated Nov. 18, 2009 in connection with U.S. Appl. No. 11/299,607.
Office Action dated Dec. 11, 2009 in connection with U.S. Appl. No. 11/468,766.
Newton, Harry, "Newton's Telecom Dictionary", New York: Pub. Group West, 1998, print, pp. 375, 376, 577, 578, 794, 799.
Office Action dated Feb. 17, 2010 in connection with U.S. Appl. No. 11/299,607.
Office Action dated Jan. 22, 2010 in connection with U.S. Appl. No. 11/608,987.
Office Action dated Aug. 17, 2010 in connection with U.S. Appl. No. 11/374,339.
Office Action dated Jul. 1, 2010 in connection with U.S. Appl. No. 11/299,607.
Office Action dated Jul. 26, 2010 in connection with U.S. Appl. No. 11/608,987.
Office Action dated Nov. 15, 2010 in connection with U.S. Appl. No. 11/299,607.
Office Action dated May 5, 2011 in connection with U.S. Appl. No. 11/468,766.
Office Action dated May 9, 2011 in connection with U.S. Appl. No. 11/374,339.
Office Action dated Aug. 2, 2011 in connection with U.S. Appl. No. 11/299,607.
Office Action dated Aug. 26, 2011 in connection with U.S. Appl. No. 11/464,127.
Office Action dated Sep. 29, 2011 in connection with U.S. Appl. No. 11/374,339.
Office Action dated Jul. 18, 2012 in connection with U.S. Appl. No. 11/608,987.

(56) References Cited

OTHER PUBLICATIONS

Office Action dated Jan. 30, 2013 in connection with U.S. Appl. No. 11/608,987.

Office Action dated Mar. 10, 2011 in connection with U.S. Appl. No. 11/299,607.

Office Action dated Mar. 8, 2011 in connection with U.S. Appl. No. 11/464,127.

Office Action dated Jan. 31, 2011 in connection with U.S. Appl. No. 11/468,766.

Office Action dated Jul. 5, 2013 in connection with U.S. Appl. No. 11/608,987.

Office Action dated Jul. 5, 2013 in connection with U.S. Appl. No. 11/374,339.

* cited by examiner

REMOTE DATA ACQUISITION, TRANSMISSION AND ANALYSIS SYSTEM INCLUDING HANDHELD WIRELESS EQUIPMENT

CROSS REFERENCE TO RELATED APPLICATIONS

This application is a continuation of U.S. patent application Ser. No. 09/971,170 filed Oct. 4, 2001 entitled "Remote Data Acquisition, Transmission and Analysis System Including Handheld Wireless Equipment"; which is a continuation-in-part of U.S. patent application Ser. No. 09/267,254 filed Mar. 12, 1999 entitled "Remote Data Acquisition and Transmission System and Method", now U.S. Pat. No. 6,457,038, which claims priority to U.S. Provisional Patent Application Ser. No. 60/078,645, filed Mar. 19, 1998, and entitled "Remote Data Acquisition and Transmission System for the Monitoring and Control of Vending Machines" and to U.S. Provisional Patent Application Ser. No. 60/099,434, filed Sep. 8, 1998, and entitled "Remote Data Acquisition and Transmission System."

U.S. patent application Ser. No. 09/971,170 also claims priority to U.S. Provisional Patent Application Ser. No. 60/238,313, filed Oct. 5, 2000, and entitled "Remote Data Acquisition, Transmission and Analysis System Including Handheld Wireless Equipment."

TECHNICAL FIELD OF THE INVENTION

The present invention relates in general to the field of remote data acquisition. More particularly, the present invention relates to using handheld wireless equipment with remote data acquisition, transmission, and analysis systems, such as systems for monitoring and controlling of vending machines or other remotely located machines.

BACKGROUND OF THE INVENTION

Over the past decade, vending machine manufacturers and software developers have created new and innovative vending equipment and applications in response to market needs and vending operator demands. These innovations have been, for the most part, adopted by the beverage and food vending industry. Also, vending machines are now used with a much wider variety of products as compared to traditional food and beverage vending.

These trends have been influenced by the accelerating rate of technological innovation in the software and electronic and electro-mechanical component industries. The availability of new technologies has given vending machine manufacturers and software developers the tools to address many of the requirements of vending operators. Advances in software and electronics are now enabling the use of computer controls and data acquisition systems directly inside a vending machine. Some of the latest vending machines now make it possible for vending machine operators to download sales, inventory, and machine operating information on-site onto portable computers. Although these computerized systems make it easier for operators to gather and analyze data, they generally do not provide real time capabilities that are needed to make a major impact on overall vending operations.

There currently exist various remote data capture systems in the vending industry. Examples of such systems include the systems disclosed in U.S. Pat. Nos. 5,608,643; 4,766,548 and 4,412,292. Most of the conventional systems make use of point-to-point data acquisition systems that use a wireless data transmission system to receive and send information from/to individual vending machines. Some of the systems use wireline data transmission systems (e.g. telephone lines) while others use wireless transmission systems (e.g. cellular)

Systems that implement wireless point-to-point communications using long-range wireless transceivers at each vending machine often have a significant limitation in that they cannot be made to function properly in locations that do not have a clear RF path to an associated central base station outside the building, perhaps even miles away. For example, if a vending machine is located deep inside a building, the ability to transmit/receive data to/from the outside of the building is hampered by signal attenuation caused by the building's structure. On the other hand, wireline systems that, by their nature, are immune to in-building reliability problems typically suffer from high infrastructure costs given that dedicated wire must be drawn to each vending machine in order to create the required point-to-point data link. Establishing a wireline system is often a difficult task and frequently limits the ability to move associated vending machines from one location to another location. Thus, conventional remote data capture systems generally do not adequately fill the needs of vending machine operators for remote data acquisition, transmission and analysis.

Some conventional remote data acquisition systems employ a point-to-point wireless communication link to retrieve information from and send information to a plurality of remote devices. Further, wide-area networks (WAN) are often formed from a plurality of local area networks (LANs), and such LANs are often interconnected using a wireline or wireless data transmission system. In other technical areas, wireline and wireless transceivers have been used for local area network communication. For example, power line networks are used in a variety of applications such as in the implementation of "smart building" functions, including the systems disclosed in U.S. Pat. Nos. 3,976,264 and 4,763,104. Yet wireline and wireless LAN communications have generally not been implemented for purposes of data acquisition or vending machine management.

In general, conventional remote data acquisition systems that implement WAN/LAN architectures for collecting data from distributed equipment (e.g. vending machines) use data collected at a predefined time during the day to generate reports that will be used to drive specific actions to be taken until the next data collection period arrives. In the case of vending operators, this type of architecture has prevented their field operations personnel from carrying with them, or generating on demand while in the field, the latest and most accurate reports based on real or near real-time data collected from the vending machines. In other applications, handheld wireless computers allow field operations personnel to interact with their enterprise data on a real-time data to mitigate this issue. Yet this type of handheld wireless technologies have generally not been implemented for the purposes of data acquisition from field equipment or vending machine management. In addition, this type of handheld communications technology has not been generally implemented for the purposes of controlling field equipment to perform service or other functions such as financial transactions (e.g. purchase of product).

SUMMARY OF THE INVENTION

In accordance with teachings of the present invention, a remote data acquisition, transmission and analysis system which includes a network operations center and handheld wireless equipment is provided with advantages over previously developed remote data acquisition systems. In one embodiment, the remote data acquisition, transmission and analysis system may be used to monitor the status of vending machines using handheld wireless equipment. The remote data acquisition, transmission and analysis system in cooperation with such handheld wireless equipment allows vending machine operators to gather up-to-date data while in the field without having to manually retrieve the data from each vending machine or establish a conventional (e.g. wired) communication with such data collection and analysis systems that would normally be available at the home office. This ability will generally lead to improved servicing of vending machines and lower operational costs by enhancing the ability of manager's and field operations personnel to direct operations and react quickly to the changing needs of the vending machines in the field.

According to one aspect of the present invention, the system comprises one or more application controllers and an application host. The application controller or controllers are preferably interfaced with remote equipment from which operation data may be acquired and information transmitted thereto. Each application controller communicates with an application host via a local area network. The application host or hosts communicate with a network operations center using a wide area network (WAN) interface. The system may include a local area network (LAN) with one unit and its associated application host or multiple units and associated application hosts. The handheld wireless equipment may communicate with both the local area network (LAN) and the wide area network (WAN). For some embodiments of the present invention, the handheld wireless equipment may communicate with the network operations center using the same WAN as the application host or hosts. For other embodiments of the present invention, the handheld wireless equipment may communicate with the network operations center using a WAN which is different from the WAN used by the application host or hosts. The handheld wireless equipment may obtain information from the database and associated software applications available through the network operations center via a WAN.

According to another aspect of the present invention, a remote data acquisition, transmission and analysis system including handheld wireless equipment is provided for use with a wide variety of remotely located machines. The system preferably includes a plurality of application controllers. Each application controller may interface, via a serial interface to a respective machine controller from which operation data may be acquired as desired by the application controller. The system may also include an application host that communicates with the application controllers via a LAN. The application host or hosts preferably includes a WAN interface for communicating with a network operations center. The network operations center typically communicates with the application host or hosts via the WAN to receive the desired operation data from the application controllers and to manage outgoing messages and/or data. Further, the application controllers and the application host or hosts may operate to auto configure the LAN upon initialization. The network operations center preferably maintains a database storing the operation data, software applications for analyzing and managing the data, and providing secure third party access to the database and the applications.

Technical advantages of the present invention include the use of local wireline and/or local-area wireless transmissions to implement a LAN between multiple machines. This provides a remote data acquisition system for machines that overcomes many limitations of current point-to-point systems by establishing a low-cost LAN that can then communicate externally using a long-range wireless or wireline communication system. For example, a narrowband PCS wireless link (e.g., wireless two-way paging network) can be used between a remote vending machine LAN and a network operations center to establish an efficient and low-cost WAN which connects remote LANs together to form a larger network.

Additional technical advantages of the present invention include the ability for personnel responsible for maintaining and servicing remote machines to obtain information from a network operations center using the handheld wireless equipment. When the service personnel arrive at a large building or facility containing multiple vending machines, the handheld wireless equipment may be used to contact the network operations center in accordance with teachings of the present invention to determine current requirements for maintenance and servicing of the specific vending machines contained within the large building and/or facility. Incorporating handheld wireless equipment into a system for data acquisition, transmission, and analysis in accordance with teachings of the present invention substantially increases efficiency and reduces cost of maintaining and servicing remote machines such as vending machines by ensuring that only necessary supplies and equipment are taken from the service vehicle to the building or facility as specifically required by the machines contained therein by identifying any new conditions that might have arisen since the previous data collection. Obtaining current, accurate status of vending machines is particularly important when perishable products such as ice cream must be moved from a service truck to one or more vending machines located in a very large building or other large facility.

The above described feature, which may sometimes be referred to as "curb-side polling", includes using a handheld wireless equipment to initiate data communication with a network operations center during which operation data is obtained from machines which require servicing at a respective large building or facility. The network operations center will accumulate and process new data to generate information concerning the status of the respective machines and identify specific requirements for servicing and maintaining of each machine. Another aspect of the present invention includes using the same handheld wireless equipment to directly communicate with one or more of the machines in a large building or facility using an associated LAN.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention and its advantages are best understood by referring to FIGS. 1 through 12 of the drawings, like numerals being used for like and corresponding parts of the various drawings.

Various aspects of the present invention will be described with respect to remote point of sale equipment and remote dispensing equipment, such as vending machines, and a network operations center associated with maintaining, controlling, and servicing such equipment. However, a remote data acquisition, transmission, and analysis system formed in accordance with teachings of the present invention may be used with a wide variety of machines such as copiers, ice manufacturing and dispensing equipment, computer work stations, photographic booths and any other type of equipment or machine that requires routine maintenance and servicing. According to teachings contained herein, remote point of sale equipment and remote dispensing equipment are not necessarily indicative of similar devices and, further, the present invention is not limited to use with only vending machines.

Figure 1:
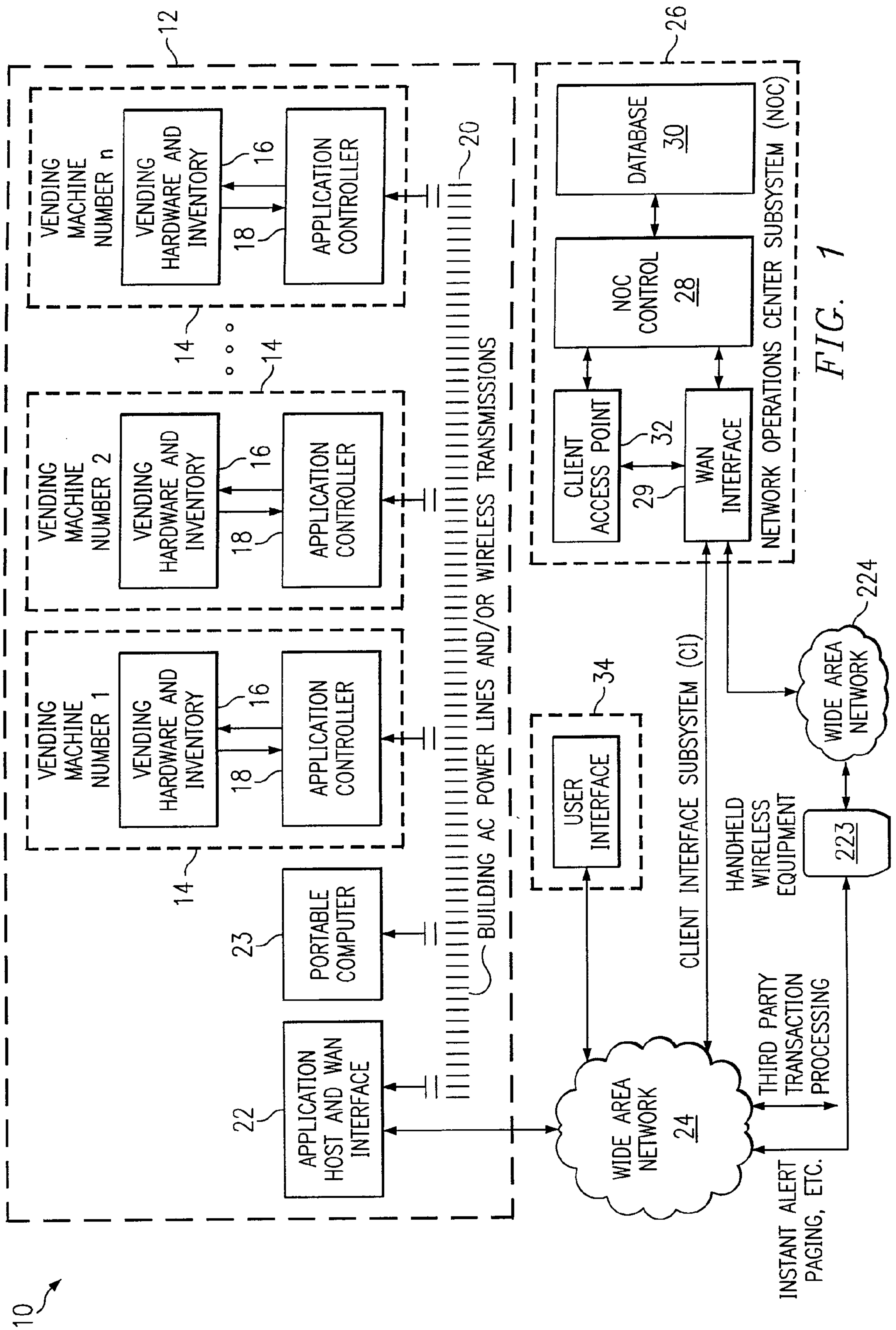
FIG. 1 is a functional block diagram of one embodiment of a remote data acquisition, transmission and analysis system including handheld wireless equipment for monitoring and controlling in accordance with teachings of the present invention the operation and servicing of a variety of machines such as vending machines.

FIG. 1 is a functional block diagram of one embodiment of a remote data acquisition, transmission, and analysis system for vending machines, indicated generally at 10, incorporating teachings of the present invention. In general, system 10 of FIG. 1 communicates information from a vending site 12 externally over a wide area wireless or wireline network and internally over a local area wireless or wireline network. As shown, the local area network at vending site 12 can be referred to as a vendor interrogation LAN subsystem (VIL). Vending site 12 may include only one vending machine 14 or a plurality of vending machines 14. Each vending machine 14 may include vending hardware and inventory 16 for performing vending functions and electronically tracking some vending information. Vending machines 14 may provide various types of products to customers such as soft drinks, snacks, toys, etc.

According to the present invention, each vending machine 14 may include an application controller 18 coupled to and interfacing with vending hardware and inventory 16. Many vending machines 14 are equipped with electronics for controlling vending operations as well as tracking some vending events such as money received, change given and number of vends from each slot. Application controllers 18 can communicate with such embedded electronics as well as be equipped to directly sense other vending events and vending equipment parameters (e.g. compressor performance). Application controllers 18 can also communicate with one another and a respective application host 22 via onboard wireline interfaces or wireless transceivers using wireline or wireless transmissions respectively.

The term "wireline transmissions" is used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wireline transmissions may be conducted in accordance with teachings of the present invention over electrical power lines, electrical power distribution systems, building electrical wiring, conventional telephone lines, T-1 lines, T-3 lines, ISDN lines, ADSL, etc.

The term "wireless transmissions" is used to refer to all types of electromagnetic communications which do not require a wire, cable, or other types of conduits. Examples of wireless transmissions for use in local area networks (LAN) include, but are not limited to, radio frequencies, especially the 900 MHz and 2.4 GHz bands, infra-red, and laser. Examples of wireless transmissions for use in wide area networks (WAN) include, but are not limited to, narrowband personal communications services (PCS), broadband PCS, circuit switched cellular, and cellular digital packet data (CDPD), etc.

For some applications, Bluetooth wireless technology may be satisfactorily used with system 10 particularly to establish a LAN and communication between the LAN and handheld wireless equipment. Bluetooth technology uses radio wave transmissions, which do not require line-of-sight and allow data communication through walls and other structures at relatively fast data transfer rate. A wide variety of handheld wireless devices and equipment has been or will be modified to include Bluetooth technology, including cell phones, personal data assistants (PDA), laptop computers, notebook computers, and similar devices. Bluetooth transmitters/receivers have been incorporated into both handheld devices and large stationary machines. Bluetooth uses the frequency range of approximately 2.4 GHz, which currently does not require a license.

Together, application controllers 18 and application host 22 form a LAN supported by the wireline and/or wireless transmissions 20. In addition, application controllers 18 can also act as repeaters in case application host 22 cannot directly communicate with a particular application controller 18 while another application controller 18, which does have an established communication link with application host 22, can directly communicate.

Application host 22 acquires data captured by application controllers 18 and can package and communicate that data across an external network 24 using a wide area network (WAN) interface. Application host 22 may be installed together with application controller 18 inside a piece of remote point of sale equipment or a piece of remote dispensing equipment such as a vending machine or housed separately in another location. In the event that the application host 22 is placed inside a vending machine together with an application controller 18, it is possible to share some of the electronic components between them, the LAN transceiver for example, in order to reduce the cost of the hardware. In this case, the application host 22 and application controller 18 inside the same vending machine, would communicate with each other over a hardwired interface between the two components. Alternatively, application host 22 and application controller 18 can be designed to be a single integrated component within a vending machine. Furthermore, an application host 22 can be used whose function consists of solely monitoring the application controllers 18. For example, such an application host 22 could take the form of a hand-held portable computer 23 to be carried by service or delivery personnel in order to query the application controllers 18 without having to interact via the WAN interface.

WAN interface 22 can be implemented in one of a number of ways. In particular, WAN interface 22 is designed to support a wide area network 24 that can be implemented via wireline or wireless transmissions. If a wireless narrowband PCS paging network is used to implement the WAN, messages from application host 22 can be communicated as digital messages through the pager network and stored in one or more dedicated message mailboxes provided by the wireless network operator or transmitted directly by the carrier through some other electronic means such as e-mail, FTP, direct socket connection, etc. Any of the means described above can be implemented securely and reliably, for example, through an Internet-based connection.

As shown in FIG. 1, a network operations center (NOC) 26 communicates with one or more vending sites 12 across wide area network 24. As mentioned, in one implementation, network operations center 26 can access mailboxes that store message transmitted by application hosts 22 at vending sites 12. In the embodiment of FIG. 1, network operations center 26 may include NOC control 28 that communicates with wide area network 24 through a WAN interface 29. NOC control 28 can receive data acquired from and transmit data to vending sites 12, process the data and store the data into a database 30. NOC control 28 can also perform instant alert paging, direct dial alarms and other functions to provide real time notification to a vending operator upon the occurrence of certain events (e.g., out-of-stock, power outage, vandalism, etc.). NOC control 28 can also provide third party transaction processing such as allowing queries on database 30. The WAN interface 29 between NOC control 28 and the wide area network 24 can be implemented through the use of either wireline or wireless transmissions.

At network operations center 26, a client access point 32 provides access from a client interface subsystem (CI) 34 across external network 24. In one implementation, client access point 32 can be a web-based interface allowing user access from a client computer across a network such as the Internet. Other implementations include providing a direct-dial connection between client interface subsystem 34 and client access point 32. Once connected, a user can use client interface subsystem 34 to obtain information from database 30 based upon data acquired from vending sites 12. Further, users can be provided with extended services such as trend information developed by mining and analyzing database 30.

According to teachings of the present invention, system 10 of FIG. 1 combines a number of technologies to provide technical advantages for managing, controlling, servicing and maintaining remotely located machines such as vending machines. For the embodiment of the present invention as shown in FIG. 1, handheld wireless equipment 223 may communicate with network operations center 26 using WAN 24. Alternatively, handheld wireless equipment 223 may communicate with network operations center 26 using WAN 224, which is different from WAN 24. Also, handheld wireless equipment 223 may be used to directly communicate with application controllers 18 in the same manner as previously described with respect to portable computer 23. For some applications, handheld wireless equipment 223 may be the same portable computer 23. For other applications, handheld wireless equipment 223 may be a Palm Pilot, Personal Data Assistant, pager, or any other type of handheld wireless data transmission and receiving equipment.

A wide variety of software applications and programs may be satisfactorily used with application controllers 18, application host 22, network operations center 26, portable computer 23, and handheld wireless equipment 223. For example, various components of system 10 may include operating systems such as UNIX, Macintosh OS, and Windows. The software program applications associated with system 10 may use Java or any other suitable program language or application environment. Additionally, system 10 may be operable to use different types of markup languages for communicating with network operations center 26. Such markup languages may include, but are not limited to, Hypertext Markup Language (HTML), Extensible Markup Language (XML), Wireless Markup Language (WML). Various communication protocols and applications such as Internet Protocol (IP), Transmission Control Protocol (TCP), Transmission Control Protocol/Internet Protocol (TCP/IP), Wireless Application Protocol (WAP), Global System for Mobile (GSM) communications, Time Division Multiple Access (TDMA), Code Division Multiple Access (CDMA), User Datagram Protocol (UDP), Wireless Session Protocol (WSP), Wireless Transaction Protocol (WTP), Wireless Datagram Protocol (WDP), Windows CE, i-mode, Palm OS applications and Palm Web Clipping Applications may be used by one or more components of system 10 to communicate information and data associated with operation, maintenance, and control of remotely located machines.

Examples of handheld wireless equipment which may be satisfactorily used with a data acquisition, transmission, and analysis system in accordance with the teachings of the present invention include, but are not limited to, mobile phones, internet phones, one-way pagers, two-way pagers, personal data assistants (PDAs), and handheld computers, laptop computers, and portable computers with wireless modems. Handheld wireless equipment satisfactory for use with the present invention may include only one-way communication of data from the associated network operations center or may allow two-way communication between the handheld wireless equipment and the associated network operations center.

Figure 2:
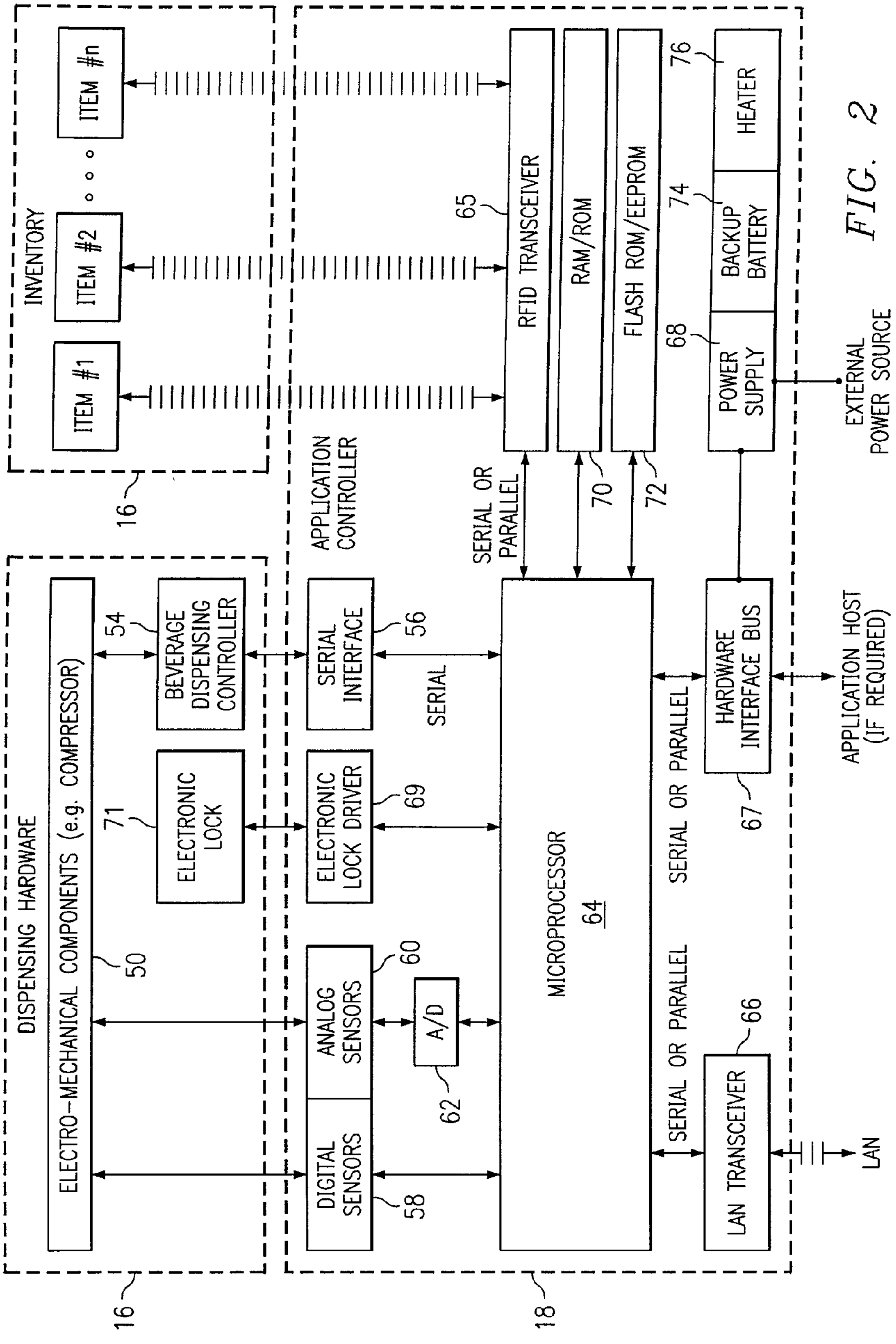
FIG. 2 is a functional block diagram of one embodiment of an application controller and its interface with vending hardware according to the present invention.

FIG. 2 is a functional block diagram of one embodiment of the interface between application controller 18 and vending hardware and inventory 16 according to the present invention. In general, application controller 18 interfaces to the internal systems of vending machine to perform data acquisition and control functions and to provide a wireline and/or wireless data communication transceiver for establishing a communication link with application host 22 (FIG. 1). As shown, vending hardware 16 can include electro-mechanical components 50, some of which are coupled to and interface with a vending machine controller (VMC) 54.

Application controller 18 interfaces with vending hardware 16. As shown, this interface can include a serial interface 56 (e.g., Multi-Drop Bus, DEX Port or Universal Serial Bus (USB), RS-232, RS-485, or any other serial interface standard implemented by the vending machine equipment) that communicates with VMC 54 using a standard data protocol (e.g. DEX/UCS) implemented by many conventional vending machines. The interface can also include direct sensing of components 50 using digital sensors 58 and analog sensors 60. Analog sensors 60 can be coupled to analog-to-digital (A/D) converters 62 to convert analog measurements to digital signals. A central microprocessor or microcontroller 64 can be coupled to and interface with serial interface 56, digital sensors 58 and A/D converters 62 to acquire data relating to the operation of vending hardware 16. Application controller 18 also can include RFID transceiver device 65 that can directly scan inventory 16 in order to obtain inventory readings. For example, RFID 65 could generate a radio signal that is received by passive transponders attached to inventory items. These transponders can then reply with unique identifiers to the application controller 18 to determine exact inventory levels.

Microprocessor 64 can communicate inventory, event and other data using a wireline or wireless LAN transceiver 66 that sends the data via wireline or wireless transmissions respectively. As discussed above, microprocessor 64 can transmit/receive data to/from an application host located at the vending site or to/from a hand-held portable computer acting as an application host. Microprocessor 64 can also communicate with an electronic lock driver 69 which interfaces with an electronic lock 71. In the event that an application controller is collocated with an application host within a vending machine, then the two can communicate using a hardware interface bus 67 which allows the two devices to share electronic components, for example, the LAN transceiver 66.

Further, as shown, application controller 18 may include various types of memory units such as random access and read-only memory (RAM/ROM) 70, FLASH memory and/or Electrically Erasable/Programmable read-only-memory (Flash memory/EEPROM) 72 for storing application code and vending data. The Flash memory can be remotely programmed using the LAN and/or the WAN in the event that its data becomes corrupted or requires upgrade. The present invention is not limited to any specific type of memory unit. Further, application controller 18 may include a power supply 68, a backup battery 74 as well as a heater 76 (if needed).

Figure 3:
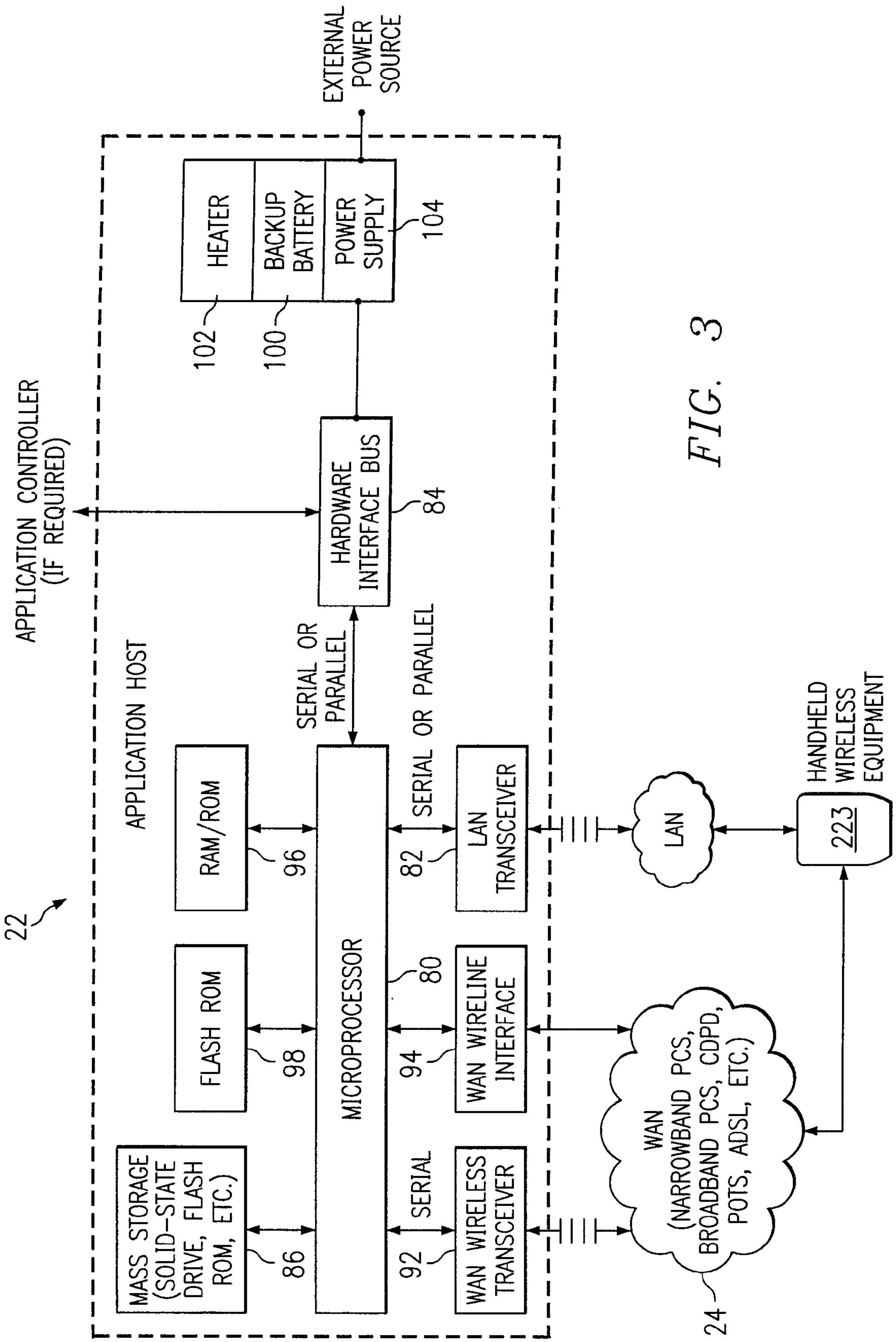
FIG. 3 is a functional block diagram of one embodiment of an application host according to the present invention.

FIG. 3 is a functional block diagram of one embodiment of application host 22 according to the present invention. In general, application host 22 can communicate with application controllers 18 and can communicate externally to establish a link with a remote computer, thus enabling the formation of the WAN. In the embodiment of FIG. 3, application host 22 includes a microprocessor 80 that communicates with application controllers 18 using a LAN transceiver 82. This communication, for example, can involve wireline and/or wireless transmissions depending upon the operating characteristics of LAN transceiver 82. Application host 22 can also communicate with an application controller 18 using a hardware interface bus 84. For example, this connection can be used in the case where application host 22 is collocated inside a vending machine together with an application controller.

Microprocessor 80 can receive data captured by application controllers 18, process the data and store the data in a mass storage device 86 (e.g., hard drive, solid-state recorder, FLASH memory). Microprocessor 80 can then retrieve data from storage device 86 and communicate data externally using a WAN wireless transceiver 92 or WAN wireline interface 94 communicating via wireless or wireline transmissions respectively. In particular, wireless transceiver 92 can be used to implement a digital paging network based communication scheme across a narrowband PCS network as mentioned above. Application host 22 can also include random access and read-only memory (RAM/ROM) 96 and/or FLASH memory 98 for storing application code and vending data. The Flash memory can be remotely programmed using the WAN in the event that its data becomes corrupted or requires upgrade. The present invention is not limited to any specific type of memory unit. Further, application host 22 can include a power supply 104, a back-up power source 100 (e.g., battery) as well as a heater 102 (if needed). Some of the components of application host 22 may be unnecessary if application host 22 and an application controller 18 are interfaced directly inside a vending machine.

Figure 4:
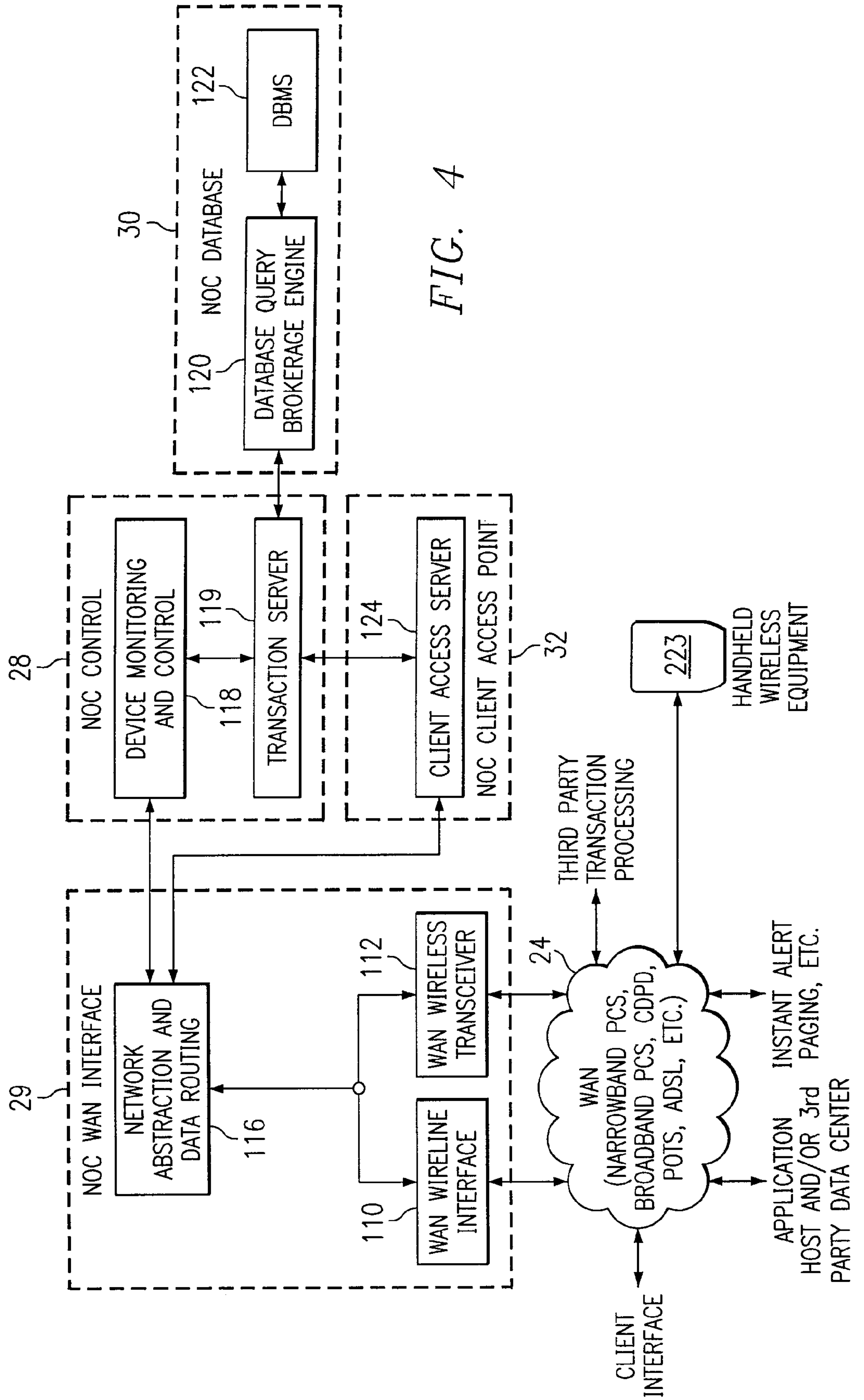
FIG. 4 is a functional block diagram of one embodiment of a network operations center which communicates with handheld wireless equipment according to teachings of the present invention.

FIG. 4 is a functional block diagram of one embodiment of network operations center 26 according to the present invention. As shown, network interface 29 can include various interface devices such as a WAN wireline interface 110 or WAN wireless transceiver 112 communicating via wireline or wireless transmissions respectively. These interface devices support connections to external network 24 and communicate internally with a network abstraction and data routing unit 116. Unit 116 can route data to NOC control 28 or client access point 32 as appropriate. Unit 116 may also be used to provide one or more software applications for use by handheld wireless equipment 223 and/or application host 22 and application controllers 18. The software applications provided by NOC control 28 through unit 116 and WAN 24 may be used for various purposes such as establishing a local database within either application host 22, application controllers 18 and/or handheld wireless equipment 223. The applications provided by NOC control 28 and unit 116 may also be used to allow handheld wireless equipment 223 to perform various operations on application host 22 and/or application controllers 18. For example, an application may be downloaded from network operations center 26 to handheld wireless equipment 223 for use in operating a respective vending machine, changing the operations characteristics (increasing or decreasing the price of a product). The present invention allows network operations center 26 to function as an application service provider. Therefore, a wide variety of software applications may be downloaded from NOC control 28 to a handheld wireless equipment and/or an associated remotely located machine to allow the handheld wireless equipment to perform a wide variety of functions including operating, maintaining and servicing the remotely located machine.

NOC control 28 can include one or more device monitoring and control units 118 and transaction servers 119 that have access to a NOC database 30. Database 30 can include a database query brokerage engine 120 connected to a DBMS 122. Client access point 32 can include a client access server 124 that also has access to database 30 through transaction server 119. Transaction servers 119 can operate to receive data acquired from remote vending machines, store and maintain data in database 30, and provide access to database 30. Client access point 32 can operate to support client access to network operations center 26 and database 30.

Figure 5:
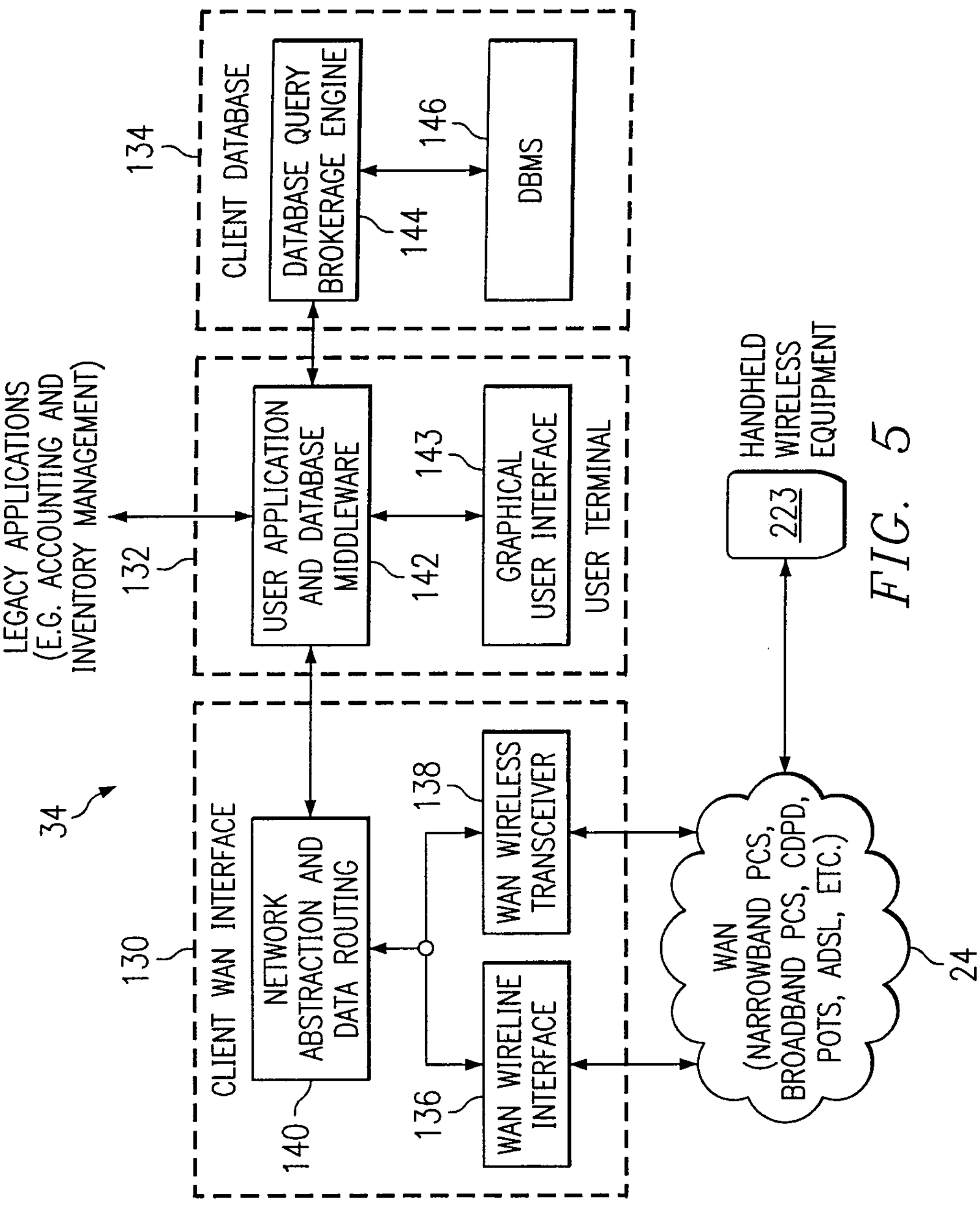
FIG. 5 is a functional block diagram of one embodiment of a client WAN interface which communicates with handheld wireless equipment according to teachings of the present invention.

FIG. 5 is a functional block diagram of one embodiment of the client interface 34 according to the present invention. As shown, client interface 34 can include a WAN interface 130, a user terminal 132 and a database 134. WAN interface 130 can have a number of interface devices for supporting connections to the wide area network 24. These may include a WAN wireline interface 136 or WAN wireless transceiver 138 communicating via wireline or wireless transmissions respectively. Network interface 130 is connected to user terminal computer 132 via a network abstraction and data routing unit 140. User terminal 132 can include a user applications and database middleware 142 and a graphical user interface 143. User terminal 132 can also be connected to database 134 which can include a database query brokerage engine software 144 and a database management system (DBMS) 146.

User terminal 132 can provide a local user with a graphical user interface 143 to accomplish a connection to client access point 32 of network operations center 26. Database 134 can locally store information obtained from network operations center 26 regarding the user's vending machine operations. Also, a local database may be provided by network operations center 26 to the associated application host 22, application controller 18 and/or handheld wireless equipment 223. Further, the user applications and database middleware 142 can allow communication with existing legacy applications that the user may have. Further, graphical user interface 143 can be a web browser-type interface. In this case, user terminal 132 could be a computer with a web browser and an Internet connection provided by the network interface 130 and all data will be stored at the network operations center database 134 and all interfacing with legacy applications will be conducted over a network interface to the network operations center.

Figure 6:
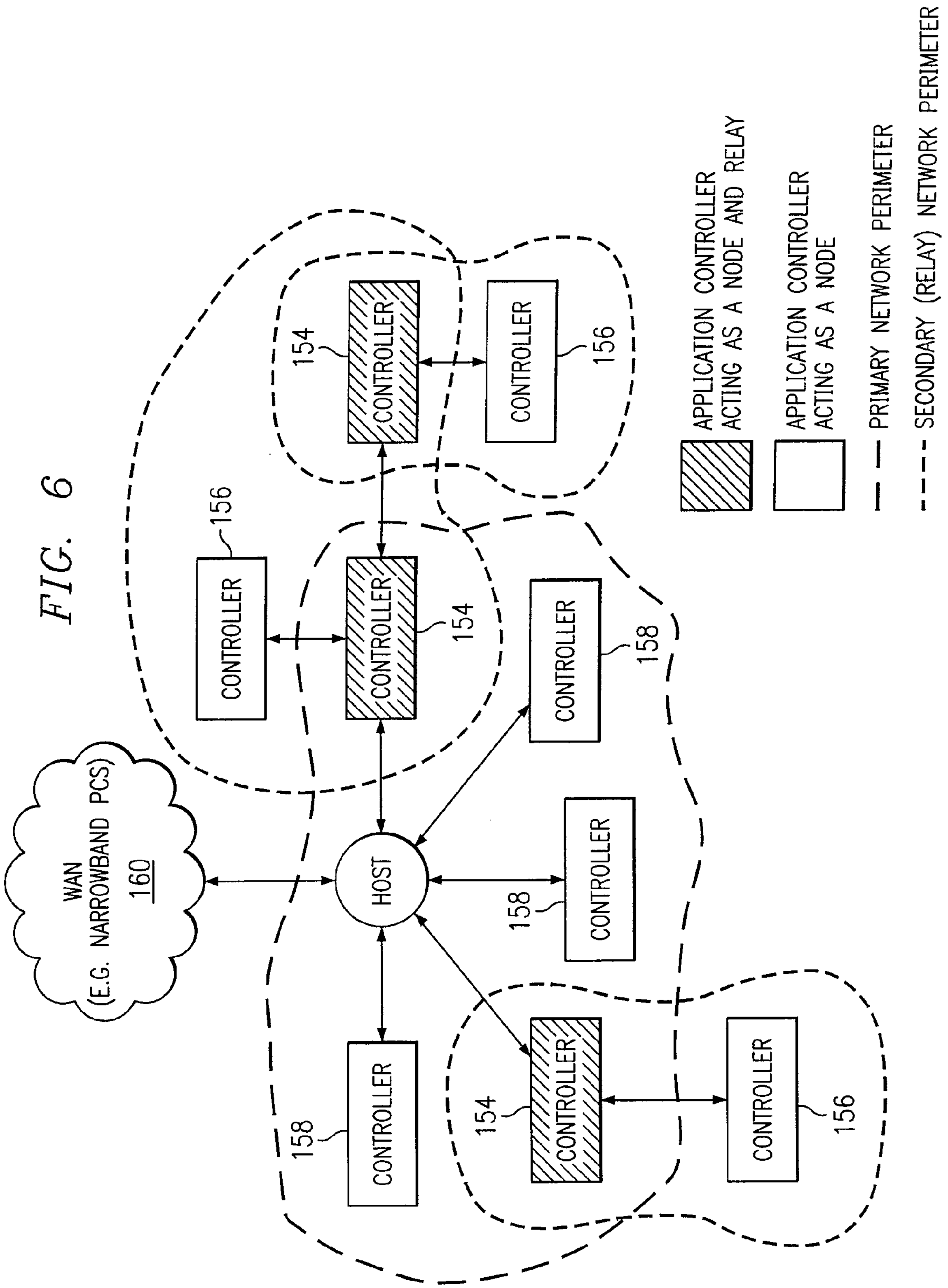
FIG. 6 is a functional block diagram of one embodiment of a wireless local area network implementation architecture according to the present invention.

FIG. 6 is a functional block diagram of one embodiment of a wireless local area network implementation architecture, indicated generally at 150, according to the present invention. In architecture 150, an application host 152 is responsible for creating, maintaining and supervising a LAN on which application controllers 154, 156 and 158 reside. Application host 152 is also responsible for transmitting and receiving information to and from WAN 160. In the illustrated embodiment, WAN 160 is implemented using a two-way narrowband PCS network. It should be understood that other WAN technologies could also be used, including POTS, ADSL, ISDN, broadband PCS, circuit-switched cellular, CDPD, Frame Relay, etc. As shown in FIG. 6, application controllers 154, 156 and 158 can act as a network node or as a network node and a relay.

In FIG. 6, application host 152 operates to route queries directed to application controllers 152, 154 and 158 and stores vending machine data transmitted by application controllers 154, 156 and 158 on the LAN. As in the case of application controllers 154, 156 and 158, application host 152 can sit on either a wireline (e.g. power line, Ethernet, POTS, etc.) or wireless (e.g. RF or IR.) LAN using the appropriate interface and/or transceiver. If application host 152 is incapable of communicating with a specific application controller 154, 156 and 158 because of attenuation and/or noise on the network, application host 152 can request another application controller 154, 156 and 158 to route the data to/from the application controller 154, 156 and 158 which is out of range.

Creation and maintenance of the network by application host 152 can be conducted in any number of ways. One such straightforward approach is discussed below. At activation, application host 152 can transmit a broadcast signal requesting all application controllers 154, 156 and 158 to respond. Application host 152 can then build a table of application controllers 154, 156 and 158 in communication range. Application host 152 can then send a broadcast message requesting that each application controller 154, 156 and 158 in turn transmit a broadcast message requesting a response from all other application controllers 154, 156 and 158 in their communication range so each of the application controllers 154, 156, and 158 can create its own table. The information in these tables will be transmitted to application host 152. Application host 152 will then compare its initial table with all the tables sent in by the individual application controllers 154, 156 and 158. Application host 152 can then identify any application controllers 154, 156 and 158 that are not within its own primary network perimeter (communication range) and will build a routing table for application controllers 154, 156 and 158 not in communication range. This routing information will then be transmitted to each application controller 154, 156 and 158 on a relay (routing) path. From then on, data being transmitted to an application controller 154, 156 and 158 outside of application host 152's primary network perimeter will contain appropriate routing information, and vice-versa. This type of network does not preclude the possibility of any single application controller 154, 156 and 158 being totally out of network coverage but does provide for a plug-and-play network creation process for those machines within primary and secondary network boundaries. Application controllers 154, 156 and 158 completely out of range may need to be moved to a more suitable location.

One example of multiple relay capabilities provided by the present invention is shown in FIG. 6. By establishing a remote data acquisition transmission and analysis system incorporating teachings of the present invention, there is no architectural limit as to the number of relays that can be implemented between the application host and any particular application controller.

In architecture 150 of FIG. 6, application host 152 can store a copy of the firmware for application controllers 154, 156 and 158 in the event that the copy on an application controller 154, 156 and 158 becomes corrupted or needs to be updated for some reason. As with application controllers 154, 156 and 158, application host 152 can also contain special bootstrap firmware that will allow it to boot up and rewrite the contents of its own firmware. The bootstrap code will signal that application host 152 requires new firmware, and the appropriate software will be sent to it over the WAN interface. This code will then be written to the Flash memory to allow application host 152 to perform the update.

Figure 7:
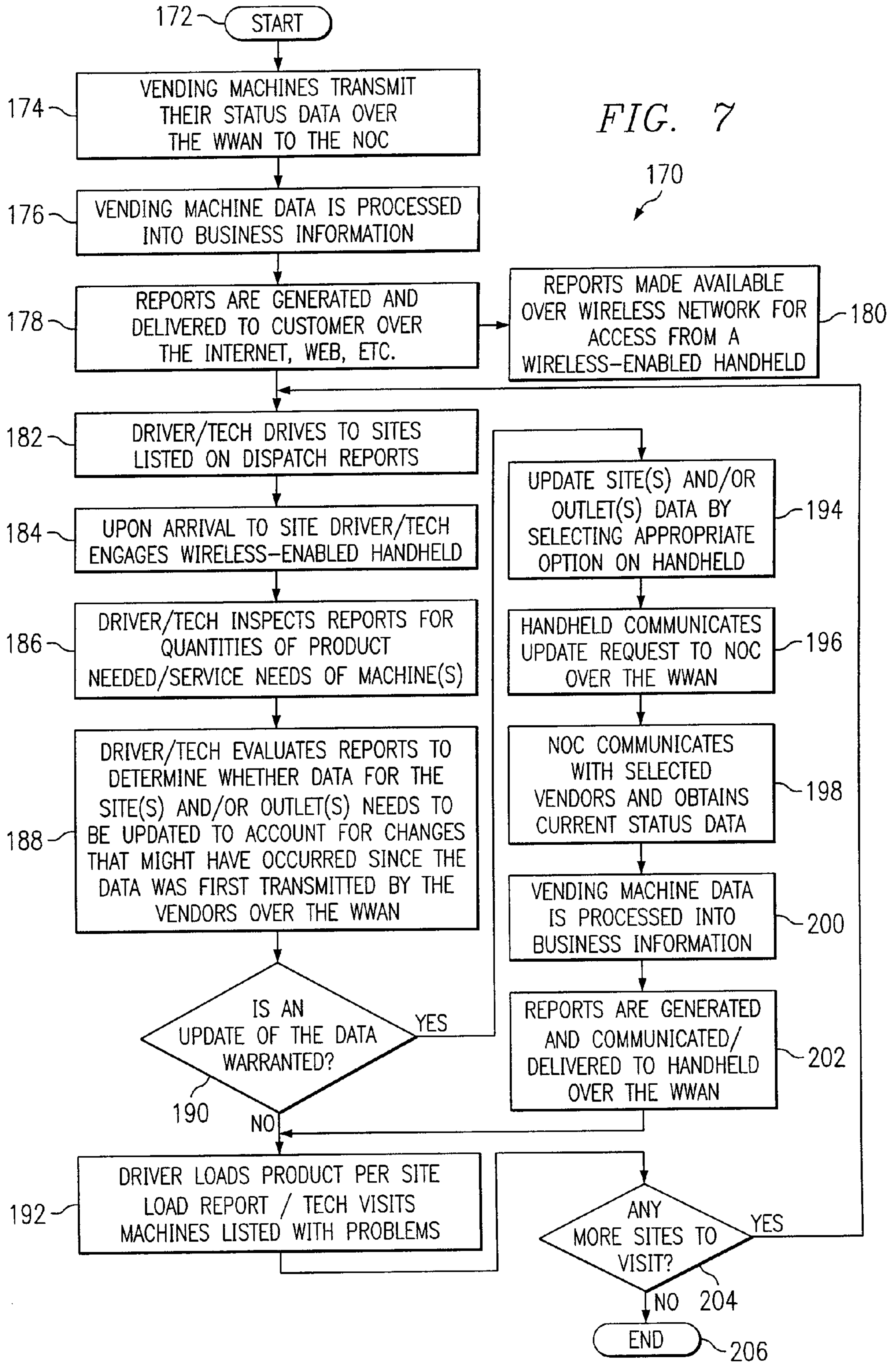
FIG. 7 is a flow diagram depicting one embodiment of a method for remote data acquisition, transmission and analysis using handheld wireless equipment in accordance with teachings of the present invention.

FIG. 7 is a flow diagram depicting one embodiment of a method for remote data acquisition, transmission and analysis using handheld wireless equipment according to teachings of the present invention. In one embodiment, method 170 preferably enables personnel responsible for maintaining and servicing remote point of sale and remote dispensing equipment to obtain information from NOC 26 using handheld wireless equipment 223. For example, at the start of each day, vending machine service personnel may contact a network operations center using handheld wireless equipment and a WAN to determine the status of vending machines within their area of responsibility and plan their route for servicing the vending machines during that day. Part of the initial daily planning will typically include placing necessary supplies and equipment on a service vehicle based on the status obtained from the network operations center for the respective vending machines. Method 170 may be altered such that computers, copiers, machinery or other devices can be maintained and serviced.

Upon initiation at 172, method 170 preferably proceeds to 174 where status data from the vending machines 14 included in system 10 is obtained by NOC 26. In one embodiment of the present invention, vending machines 14 may be configured such that each vending machine 14 transmits its status data over a wide are network, such as WAN 24 or WAN 224, at prescheduled times. In an alternate embodiment, NOC 26 may be configured to request status data associated with one or more vending machines 14 at regular intervals or according to an alternate schedule. A combination of automated vending machine 14 reporting and status data requests by NOC 26 may also be performed at 172 of method 170.

Upon receipt by NOC 26, the status data is preferably processed into a usable form or business information at 176. Processing status data from a vending machine into a usable form or business information may include the conversion of DEX/UCS data into one or more human readable formats, into a format for manipulation by one or more report generating programs, as well as other processing. In addition, the status data received from a reporting device may be in a format other than DEX/UCS, such as text. Once this initial status data has been processed into business information at 176, method 170 preferably proceeds to 178.

At 178, one or more reports may be generated from each vending machine's 14 initial status data. The reports generated at 178 may include, but are not limited to, route dispatch reports, vending site detail reports, service dispatch reports, site load reports and outlet detail reports. Also at 178, the generated reports are preferably delivered or made available to one or more users over the Internet, world wide web, or other network. Users may then use user interface 34 to view or display one or more of the generated reports.

In parallel with 178 or in sequence before or after 178, method 170 preferably makes the one or more reports available for access by personnel such as route drivers and service technicians from handheld wireless equipment 223 at 180. At 180, the reports generated at 178 may be reformatted according to the display capabilities of one or more varieties of handheld wireless equipment or may be regenerated according to one or more parameters associated with the end goal of display on handheld wireless equipment 223. Once the desired reports have been generated for Internet display as well as for display on handheld wireless equipment 223, method 170 preferably proceeds to 182.

Preferably using a wireless wide area network, such as WAN 224, a route driver or service technician can access a route or service dispatch report to identify those vending sites needing attention. At 182, once the route driver or service technician has accessed and viewed their route or service dispatch report, the route or service driver may proceed to the geographic location of a vending site identified in a report as needing attention. For some applications, the route or service driver may download an initial set of reports onto handheld wireless equipment 223 from a personal computer or other suitable source prior to starting on a route or service dispatch. When the route or service driver arrives at the location, handheld wireless equipment 223 may be further updated as discussed below. Various hot-sync techniques may be used with handheld wireless equipment 223 to provide information that increases productivity of the route or service driver. Alternatively, hard copies or print-outs of route and service dispatch reports identifying vending sites needing attention may also be provided to route drivers and service technicians at 182.

Upon arrival at a vending site, at 184, the route driver or service technician preferably engages their handheld wireless equipment 223. In one embodiment, engaging handheld wireless equipment 223 includes communicatively coupling handheld wireless equipment 223 to a communications network such as wide area network 24 or 224. Once the handheld wireless equipment 223 is engaged, if not engaged upon arrival of the route driver or service technician at the vending site, the route driver or service technician may access and review various reports generated from initial status data obtained by NOC 26 from the vending equipment at the current vending site at 186. Reports indicative of the status of vending equipment at the current vending site include, but are not limited to, site detail reports, outlet detail reports and site load reports.

During review of the various reports, the route driver or service technician may evaluate one or more reports in an effort to make a determination regarding whether the data in the reports needs to be updated or refreshed at 188. Considerations a route driver or service technician might include in making such a determination include, but are not limited to, time of day, seasonal concerns and circumstances present at the current vending site.

At 190 of method 170, the route driver or service technician preferably makes a determination of whether to update the initial status data for the vending equipment at the current vending site or to proceed as directed by the existing vending machine status reports. If at 190 the route driver or service technician decides not to update the initial status data for the current vending site, method 170 preferably proceeds to 192 where the route driver or service technician addresses the concerns for the current vending site detailed in the existing vending site reports. However, if at 190 the route driver or service technician determines that circumstances exist warranting an update to the reports generated from the initial status data for the current vending site, method 170 preferably proceeds to 194.

Figure 11:
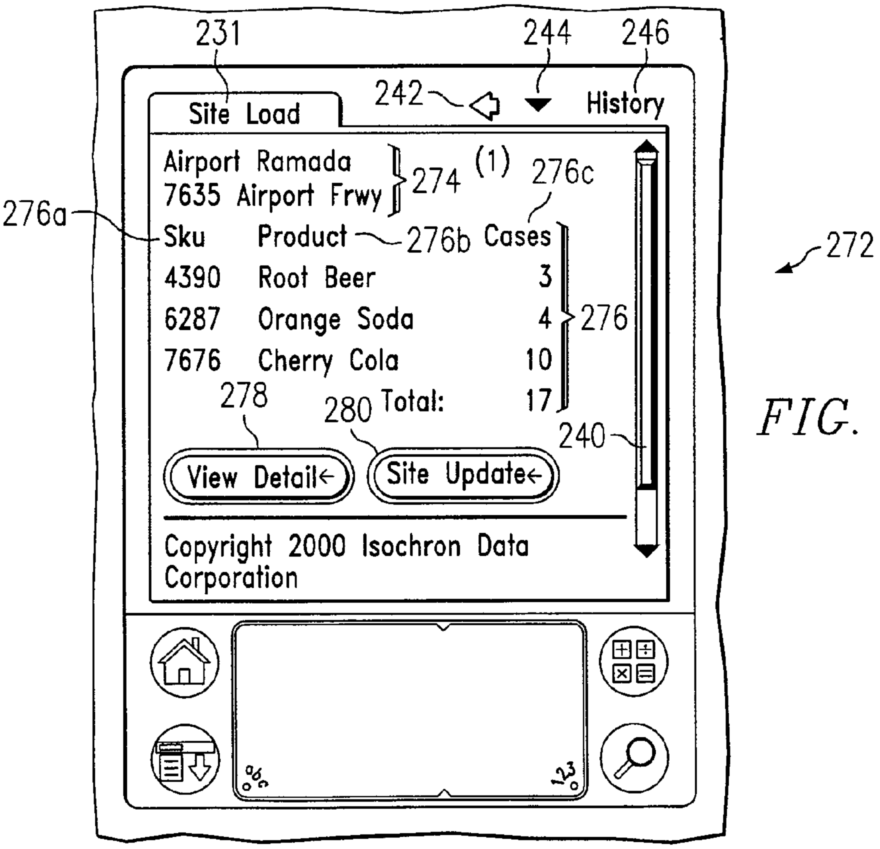
FIG. 11 is a schematic drawing showing one embodiment of a site load report formatted for display on handheld wireless equipment in accordance with teachings of the present invention.
Figure 12:
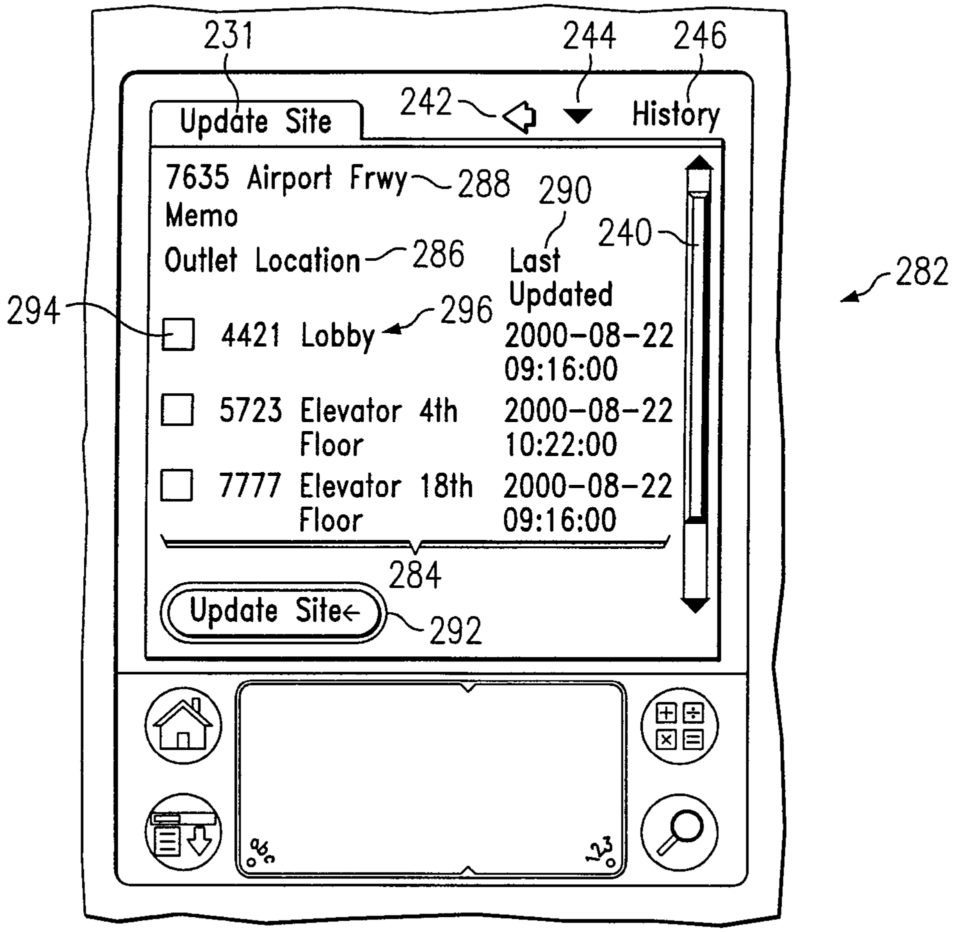
FIG. 12 is a schematic drawing showing one embodiment of an update site menu formatted for display on handheld wireless equipment in accordance with teachings of the present invention.

At 194, the route driver or service technician preferably selects a site or outlet update option, illustrated in FIGS. 11 and 12, available on handheld wireless equipment 223. Upon selection of the site or outlet update option, handheld wireless equipment 223 preferably communicates a site or outlet update request to NOC 26 at 196. In one embodiment, handheld wireless equipment 223 communicates update requests to NOC 26 over a wireless wide area network. Other communication methods are considered within the scope of the present invention.

Upon receipt of the site or outlet update request at 198, NOC 26 preferably communicates with the appropriate vendors, vending machines, vending sites, etc., to obtain current status data for the selected vending site or outlet. Once the current status data for the selected vending equipment, site or outlet is returned to NOC 26, NOC 26 preferably processes the current status data into usable or business information at 200 and one or more reports are preferably generated at 202. The current status data processing and report generating at 200 and 202, respectively, may be performed in the same manner as the status data processed at 176, 178 and 180 of FIG. 7A. Also at 202, the newly generated reports are preferably communicated or delivered to requesting handheld wireless equipment 223.

Upon receipt of the updated reports generated from current status data for the present vending site or outlet, method 170 preferably proceeds to 192. At 192, the route driver or service technician may proceed to address the concerns, e.g., inventory shortages, mechanical failures, identified in the respective vending machine status reports.

Once the route driver or service technician has addressed the concerns identified in the reports for the current vending site, method 170 preferably proceeds to 204. At 204, the route driver or service technician may determine whether there are any more vending sites or outlets needing service or other maintenance. To make such a determination, the route driver or service technician may consult the one or more reports available on handheld wireless equipment 223. If there are no more sites or outlets to be visited, method 170 preferably ends at 206. Otherwise, method 170 preferably returns to 182 where the route driver or service technician proceeds to the next site or outlet indicated on their route or service dispatch report.

Figure 8:
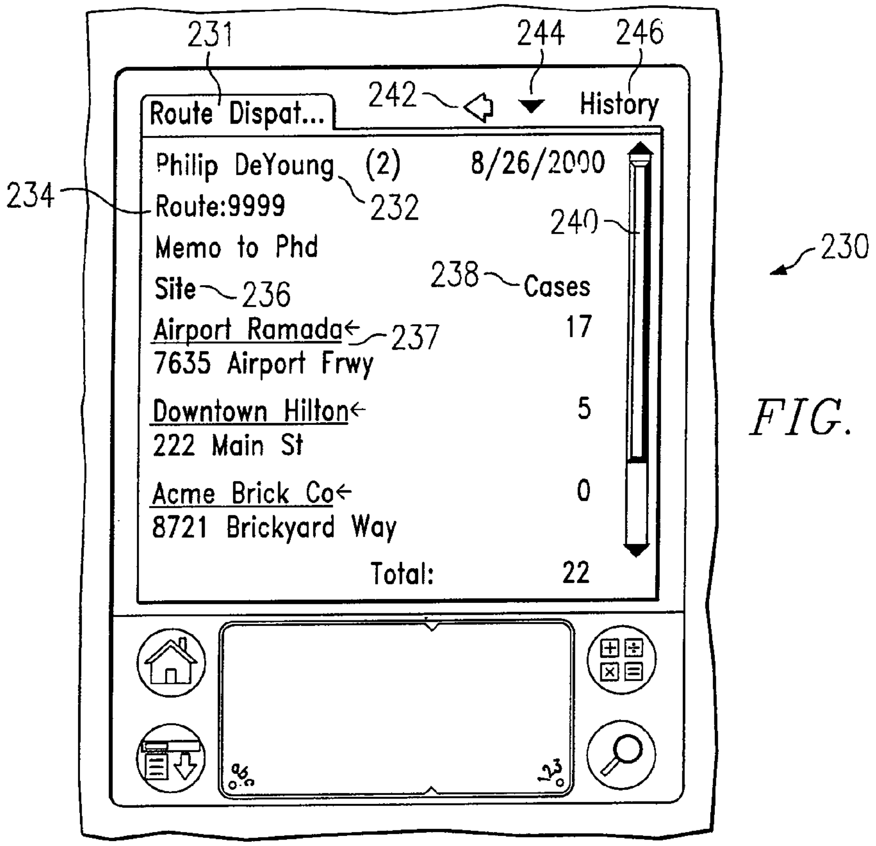
FIG. 8 is a schematic drawing showing one embodiment of a route dispatch report formatted for display on handheld wireless equipment in accordance with teachings of the present invention.

FIG. 8 is a schematic drawing illustrating one embodiment of a route dispatch report formatted and prepared for display on handheld wireless equipment 223 such as a Palm Pilot VII, Handspring Visor, Sony Clie, Pocket PC, or similar device. In one embodiment, display 230 of FIG. 8 may be displayed on handheld wireless equipment 223 in association with method 170 at 182 and 204 as well as at other points. According to teachings of the present invention, display 230 of FIG. 8 may be generated and formatted to include such information as report identification tab 231, route driver or service technician identifier 232, route identifier 234, listing 236, identifying sites needing attention, and listing 238, indicating the general needs of sites identified in listing 236.

Display 230 may also provide one or more navigation options. Navigation options provided in display 230 may include scroll bar 240, back button 242, down button 244 and history button 246. Selection of history button 246 may result in the display of previous route dispatch reports for the current route driver or service technician, for the current route, for the current outlet as well as other historical reports. Additional report items and navigation options may also be included in display 230.

As mentioned above with reference to FIG. 7, a route driver or service technician may consult a route dispatch report such as that illustrated in display 230 to identify vending sites needing service or maintenance. In one embodiment, listing 236 presents the route driver or service technician with a listing of sites needing attention on the route identified at 234. In another embodiment, listing 238 may contain information enabling the route driver or service technician to prioritize the order in which each of the sites in listing 236 are visited, e.g., prioritizing by inventory outages, by lost sales, etc.

Figure 9:
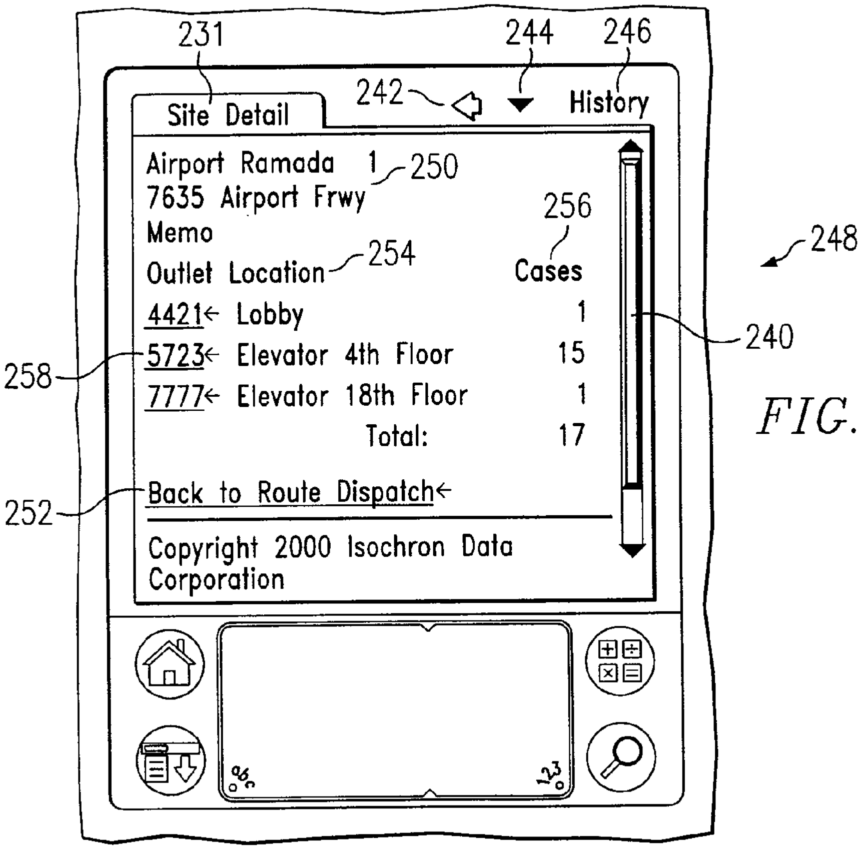
FIG. 9 is a schematic drawing showing one embodiment of a site detail report formatted for display on handheld wireless equipment in accordance with teachings of the present invention.

FIG. 9 is a schematic drawing illustrating one embodiment of a site detail report display according to teachings of the present invention. Display 248 of FIG. 9 may be utilized in association with method 170 of FIG. 7 at 186, 188, and 192 as well as at other points of method 170.

As indicated by report type tab 231, a site detail report is displayed generally at 248 of FIG. 9. A site detail report may be called up or caused to be displayed on handheld wireless equipment 223 through user selection of a site included in listing 236 of FIG. 8. For example, selection of site 237 in listing 236 of FIG. 8 preferably generates a site detail report similar to that displayed generally at 248.

In one embodiment, site detail report, such as that displayed generally at 248, preferably includes site identification information 250, back to route dispatch report display navigation button or link 252, as well as other options. In addition, the site detail report display 248 preferably includes listing 254. Listing 254 preferably includes identifiers and physical locations for each of the outlets or individual vending machines kept at the site identified at 250.

Listing 256 may also be included in site detail report display 248. Listing 256 preferably includes preview information regarding the "needs" of each of the outlets in listing 254. In one aspect of the present invention, the needs of each outlet may include quantities of product. In another aspect, the needs of each outlet may include diagnosed vending hardware problems. Alternate outlet needs are considered within the contemplation and scope of the present invention.

Should detailed information about a specific outlet at the current site be desired, the route driver or service technician may select the specific outlet from listing 254, such as outlet 258, to bring up a display indicating detailed information pertaining to the selected outlet. Selection of a specific outlet for detail preferably generates an outlet detail report such as that indicated generally at 260 in FIG. 10.

Figure 10:
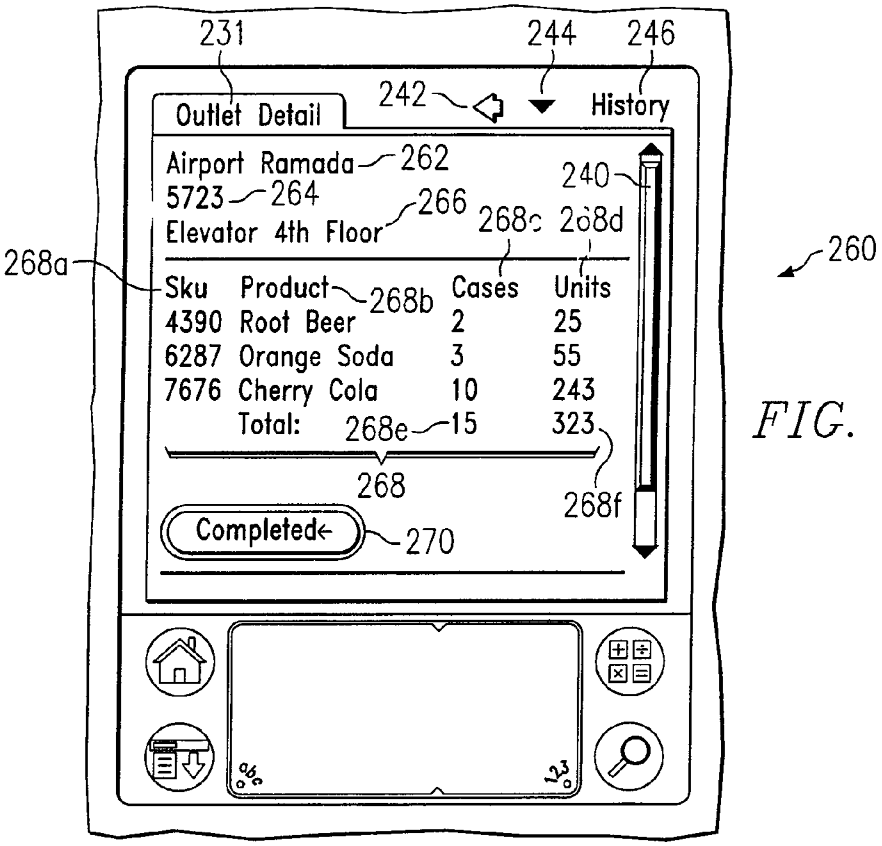
FIG. 10 is a schematic drawing showing one embodiment of an outlet detail report formatted for display on handheld wireless equipment in accordance with teachings of the present invention.

FIG. 10 is a schematic drawing illustrating one embodiment of an outlet detail report display according to teachings of the present invention. The outlet detail report displayed generally at 260 preferably includes specific, detailed information relating to the inventory, service or other needs of a selected outlet.

As illustrated in FIG. 10, outlet detail report display 260 may include such logistic information as site identification 262, outlet identifier 264 and outlet physical location information 266. In addition, outlet detail report display 260 preferably includes specific details as to the needs of the selected outlet.

For example, when a route driver uses the present invention in its capacity to replenish inventories as well as perform other duties, outlet detail report display 260 preferably includes detailed information describing what inventory need be replenished. As indicated generally at 268, assuming use of the present invention in a beverage vending machine environment, such detailed information may include SKU numbers 268*a*, product identifiers 268*b*, number of cases 268*c*, number of product units 268*d* as well as various count totals 268*e* and 268*f* of beverages required by the selected outlet. Different types of outlets may require different forms of outlet detail report displays and are considered within the contemplation and scope of the present invention.

Once the desired information has been gleaned from outlet detail report display 260, the route driver or service technician may select completed button or link 270 to return to site detail display 248. Completed button or link 270 may also be configured to mark the current outlet as attended to, refilled, serviced, etc. Completed button or link 270 may also be configured to perform other operations.

As mentioned above with reference to method 170 of FIG. 7, one aspect of the present invention contemplates enabling route drivers to accurately determine product needs at a vending site. As illustrated in FIG. 11, a route driver can access site load report display 272 before loading either a delivery truck or a hand truck.

For example, upon arrival at a vending site where the route driver is unable to position a delivery truck near a selected vending outlet or site, the route driver will typically load a hand truck with the products needed to replenish inventories, the change needed to replenish a change fund, etc. By providing the route driver with a site load report as indicated in display 272, the route driver is able to accurately load the hand truck or delivery truck and to avoid having to make the multiple trips between the delivery truck or warehouse and the selected site's or outlet's location that can result from a lack of knowledge regarding the selected site's or outlet's specific needs. Accordingly, site load report display 272 preferably provides the route driver with detailed information regarding a particular site's needs.

In one embodiment of the present invention, site load report display 272 preferably includes listing 276 indicating such information as product SKU 276*a*, product identifier 276*b* and quantity values 276*c* needed at the site or outlet indicated at 274. Site load report display 272 preferably also includes site detail button 278 enabling a user to access a site detail report such as site detail report display 248 of FIG. 9. In addition, site load report display 272 preferably also includes site update button 280 enabling the user to update the initial status data for a selected vending site or outlet with current status data for the selected vending site or outlet. In one embodiment of the present invention, site load report display 272 may be used at 192 as well as other points of method 170 illustrated in FIG. 7.

As mentioned with respect to 188 and 190 of FIG. 7, one or more factors may incline a route driver or service technician to update the initial status of one or more sites or outlets before addressing any issues or needs indicated in existing status reports. According to teachings of the present invention, one means for accomplishing such a site update is through the route driver or service technician selecting site update button or link 280 illustrated in FIG. 11. Upon selection of site update button 280, the user is preferably presented with update site display 282 of FIG. 12.

FIG. 12 is a schematic drawing illustrating one embodiment of an update site display according to teachings of the present invention. Update site display 282 preferably presents the user with listing 284 to indicate the individual outlets 286 available for update at the site indicated at 288. Also preferably included in update site display 282 and associated with the individual outlets 286 indicated in listing 284 are the last update times and dates 290 for the respective outlets 286. Logistic information, such as update times and dates 290, may be employed by the user, e.g., the route driver or service technician, to determine whether the initial status data presented in the existing status reports is adequately current or whether the initial status data should be updated with current status data. A user may be motivated to update the data for a site or outlet due to the recent passing of a lunch hour at a snack machine, due to a particularly hot day at a beverage vending site, etc. Should the user elect to update the data for the site or an individual outlet at the site, update site display 282 preferably includes update site button 292 which, when selected, initiates a routine to update a selected site's data. Such an update routine may be that routine discussed above with reference to FIG. 7. Alternatively, a user may select a checkbox 294 next to a specific outlet 296 before selecting update site button 292 such that only the specific outlet 296 selected has its initial status data updated.

In general, the present invention provides a remote data acquisition system for monitoring and control of vending machines that includes a computer controlled application host located at vending sites. The host can include a wireline interface or wireless transceiver through which a communication link with a remote computer can be established. The host can also include a wireline interface and/or wireless transceiver through which the host can communicate with a plurality of vending machines at the vending site. Each vending machine can include a microprocessor controlled set of electronics that performs the actual data acquisition functions from the vending machine and that interfaces with a wireline interface or wireless communication transceiver for establishing a link to the vending site host computer.

In the above embodiments, an application host controls operations at each vending site. In general, the application host can be implemented by software executing on a computer system that interfaces both to the vending machines on the LAN and the external network. In one embodiment, the software will have a number of software modules or objects that perform the various functions of the application host. The application controllers can also be implemented by executing software which will have a number of software modules or objects that perform the various functions of the application controllers.

Although the present invention has been described in detail, it should be understood that various changes, substitutions and alterations can be made thereto without departing from the spirit and scope of the invention.

What is claimed is:

1. A remote data acquisition, transmission and analysis system, comprising:

a plurality of application controllers, each application controller configured to interface with a respective vending machine from which operation data is acquired by the application controller, each vending machine located at one of one or more geographical sites, each application controller including a serial interface configured to communicate with the respective vending machine using a Data EXchange/Uniform Communication Standard (DEX/UCS) protocol, and a RFID transceiver configured to scan inventory associated with the respective vending machine using the DEX/UCS protocol; and at least one application host configured to communicate with the application controllers via a local area network and communicate with a network operations center remote from the one or more geographic sites using a wide area network, wherein a first of the application controllers is configured to function as a relay for communication between the at least one application host and a second of the application controllers when the second application controller is not capable of direct communication with the at least one application host, wherein the network operations center is configured to maintain a database storing the operation data and to communicate an alert message regarding at least one of the vending machines, the alert message comprising a real-time notification of at least one of an out-of-stock condition, a power outage and an incident of vandalism at the at least one vending machine.

2. The system of claim 1, wherein the local area network is configured to communicate by wireless transmissions and the application host and each application controller include a wireless LAN transceiver for communicating via the local area network.

3. The system of claim 1, wherein the application host is configured to communicate with handheld wireless equipment using the wide area network.

4. The system of claim 1, wherein the application controllers and the application host operate to auto configure the local area network upon initialization.

5. The system of claim 4, wherein the auto configuration comprises application controllers operating as relays when necessary to establish communication between the application host and other application controllers.

6. The system of claim 4, wherein during auto configuration, each application controller is configured to:

determine a list of other application controllers that are in direct communication range with the each application controller; and transmit the list to the application host;

wherein the application host uses the list from each application controller to create a routing table for the local area network.

7. The system of claim 1, wherein the wide area network interface of the application host comprises a WAN wireless transceiver.

8. The system of claim 7, wherein the WAN wireless transceiver communicates across a digital paging network.

9. The system of claim 1, wherein the wide area network interface of the application host comprises a WAN wireline interface.

10. The system of claim 1, wherein the application host is configured to store a copy of firmware used by the application controllers.

11. The system of claim 10, wherein each application controller interfaces with the respective vending machine via the serial interface to an associated vending machine controller.

12. The system of claim 10, wherein the network operations center communicates the alert message to handheld wireless equipment, the alert message comprising information regarding product sales and inventory data for the at least one vending machine.

13. The system of claim 10, wherein the network operations center communicates the alert message to handheld wireless equipment, the alert message comprising information regarding an operational status of the at least one vending machine.

14. The system of claim 1, wherein an application connecting across a wireless network provides handheld wireless equipment access to the remote network operations center.

15. The system of claim 1, wherein a wireless packet based network provides handheld wireless equipment access to the remote network operations center.

16. The system of claim 1, wherein an Internet-based network provides handheld wireless equipment access to the remote network operations center.

17. The system of claim 1, wherein a web browser connected with an Internet-based network provides handheld wireless equipment access to the remote network operations center.

18. A method for remote data acquisition, transmission and analysis, comprising:

interfacing a plurality of application controllers with vending machines from which operation data is acquired by the application controllers, the vending machines located at one or more geographical sites, each application controller communicating between a serial interface and the respective vending machine using a Data EXchange/Uniform Communication Standard (DEX/UCS) protocol and scanning, by a RFID transceiver of each application controller, inventory associated with the respective vending machine using the DEX/UCS protocol;

communicating between an application host and each of the application controllers, wherein a first of the application controllers functions as a relay for communication between the application host and a second of the application controllers when the second application controller is not capable of direct communication with the application host;

communicating the operation data between the application host and a network operations center remote to the one or more geographical sites using a respective wide area network;

storing the operation data in a database associated with the network operations center; and communicating, by the network operations center, an alert message regarding at least one of the vending machines, the alert message comprising a real-time notification of at least one of an out-of-stock condition, a power outage and an incident of vandalism at the at least one vending machine.

19. The method of claim 18, further comprising:

interfacing at least two of the application controllers with respective vending machines; and communicating between the application host and the application controllers via a local area network.

20. The method of claim 19, wherein communicating via the local area network is supported by wireless transmissions using wireless LAN transceivers.

21. The method of claim 20, wherein communicating via the local area network is supported by transmissions over a wireline interface using wireline LAN transceivers.

22. The method of claim 18, wherein communicating between the application host and the network operations center uses a wide area network interface comprising a WAN wireless transceiver.

23. The method of claim 22, wherein the WAN wireless transceiver communicates across a digital paging network.

24. The method of claim 23, wherein the digital paging network comprises a narrowband PCS network.

25. The method of claim 18, wherein communicating between the application host and the network operations center uses a wide area network interface comprising a WAN wireline interface.

26. The method of claim 18 further comprising handheld wireless equipment using a wide area network to obtain the current status of one or more of the vending machines.

27. The method of claim 18 further comprising communicating with the network operations center using the handheld wireless equipment and the respective wide area network to allow the handheld wireless equipment to execute operational commands with respect to the vending machines.

28. The method of claim 18 further comprising using the handheld wireless equipment to purchase a product from the vending machine.

29. The method of claim 18 further comprising using the handheld wireless equipment and the respective wide area network to allow the handheld wireless equipment to start and stop operation of the vending machines.

30. A remote data acquisition, transmission and analysis system comprising:

a plurality of application controllers, each application controller interfacing with a respective vending machine from which operation data is acquired by the respective application controller, the vending machines located at a geographical site, each application controller including a serial interface configured to communicate with the respective vending machine using a Data EXchange/Uniform Communication Standard (DEX/UCS) protocol, and a RFID transceiver configured to scan inventory associated with the respective vending machine using the DEX/UCS protocol; and at least one application host configured to communicate with the application controllers via a local area network defined in part by electrical power lines and communicate with a network operations center remote to the site using a wide area network interface, wherein a first of the application controllers is configured to function as a relay for communication between the at least one application host and a second of the application controllers when the second application controller is not capable of direct communication with the at least one application host, wherein the network operations center is configured to maintain a database storing the operation data and to communicate an alert message regarding at least one of the vending machines, the alert message comprising a real-time notification of at least one of an out-of-stock condition, a power outage and an incident of vandalism at the at least one vending machine.

31. The system of claim 30 further comprising:

handheld wireless equipment configured to communicate with the application host to control operation of at least one of the vending machines.

32. The system of claim 30 further comprising:

handheld wireless equipment configured to communicate with one of the application controllers via the local area network to control operation of the at least one of the vending machines.

33. A remote data acquisition, transmission and analysis system comprising:

a plurality of application controllers, each application controller interfacing with a respective vending machine from which operations data is required by the respective application controller, the vending machines located at a geographical site, each application controller including a serial interface configured to communicate with the respective vending machine using a Data EXchange/Uniform Communication Standard (DEX/UCS) protocol, and a RFID transceiver configured to scan inventory associated with respective vending machine using the DEX/UCS protocol;

at least one application host configured to communicate with a plurality of application controllers via a local area network defined in part by electrical power lines, wherein a first of the application controllers is configured to function as a relay for communication between the at least one application host and a second of the application controllers when the second application controller is not capable of direct communication with the at least one application host; and the application host communicating with a network operations center remote to the site using a wide area network interface, wherein the remote network operations center is configured to maintain a database storing the operation data, to provide access to the database, and to communicate an alert message regarding at least one of the vending machines, the alert message comprising a real-time notification of at least one of an out-of-stock condition, a power outage and an incident of vandalism at the at least one vending machine.

* * * * *

UNITED STATES PATENT AND TRADEMARK OFFICE

CERTIFICATE OF CORRECTION

PATENT NO. : 8,631,093 B2
APPLICATION NO. : 11/560480
DATED : January 14, 2014
INVENTOR(S) : Defosse It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 721 days.

Signed and Sealed this
Twelfth Day of May, 2015

Michelle K. Lee
*Director of the United States Patent and Trademark Office*